(12) United States Patent
Horowitz et al.

(10) Patent No.: US 11,157,465 B2
(45) Date of Patent: *Oct. 26, 2021

(54) SYSTEM AND INTERFACES FOR PERFORMING DOCUMENT VALIDATION IN A NON-RELATIONAL DATABASE

(71) Applicant: MongoDB, Inc., New York, NY (US)

(72) Inventors: Eliot Horowitz, New York, NY (US); David Lenox Storch, Brooklyn, NY (US); Mathias Benjamin Stearn, New York, NY (US)

(73) Assignee: MongoDB, Inc., New York, NY (US)

( * ) Notice: Subject to any disclaimer, the term of this patent is extended or adjusted under 35 U.S.C. 154(b) by 1127 days.

This patent is subject to a terminal disclaimer.

(21) Appl. No.: 15/605,069

(22) Filed: May 25, 2017

(65) Prior Publication Data

US 2017/0262441 A1 Sep. 14, 2017

Related U.S. Application Data

(63) Continuation-in-part of application No. 15/223,654, filed on Jul. 29, 2016, now Pat. No. 10,891,270.

(60) Provisional application No. 62/355,470, filed on Jun. 28, 2016, provisional application No. 62/262,942, filed on Dec. 4, 2015, provisional application No. 62/341,485, filed on May 25, 2016.

(51) Int. Cl.
| | |
|---|---|
| *G06F 7/00* | (2006.01) |
| *G06F 16/21* | (2019.01) |
| *G06F 16/215* | (2019.01) |
| *G06F 40/226* | (2020.01) |
| *G06T 11/20* | (2006.01) |

(52) U.S. Cl.
CPC .......... *G06F 16/211* (2019.01); *G06F 16/215* (2019.01); *G06F 40/226* (2020.01); *G06T 11/206* (2013.01)

(58) Field of Classification Search
CPC .... G06F 16/211; G06F 16/215; G06F 40/226; G06T 11/206
See application file for complete search history.

(56) References Cited

U.S. PATENT DOCUMENTS

| | | |
|---|---|---|
| 6,405,195 B1 | 6/2002 | Ahlberg |
| 7,800,613 B2 | 9/2010 | Hanrahan et al. |
| 8,296,200 B2 | 10/2012 | Mangipudi et al. |
| 8,510,349 B1 | 8/2013 | Puttick |
| 8,843,453 B2 | 9/2014 | Koren et al. |
| 9,671,944 B2 | 6/2017 | Hanumara et al. |
| 9,747,360 B2 | 8/2017 | Xue et al. |
| 9,886,483 B1 | 2/2018 | Harrison et al. |
| 10,169,446 B1 | 1/2019 | Garlapati |
| 10,891,270 B2 | 1/2021 | Hrabovsky et al. |
| 2002/0149614 A1 | 10/2002 | Biebesheimer et al. |
| 2004/0181543 A1 | 9/2004 | Wu et al. |
| 2005/0288957 A1 | 12/2005 | Eraker et al. |

(Continued)

*Primary Examiner* — Azam M Cheema
(74) *Attorney, Agent, or Firm* — Wolf, Greenfield & Sacks, P.C.

(57) ABSTRACT

A system is provided that includes a document validation within a non-relational database system that is capable of reviewing documents according to one or more validation rules. The document validator may be incorporated within a non-relational database engine and may perform validation operations when one or more database functions are performed.

32 Claims, 14 Drawing Sheets

(56) References Cited

U.S. PATENT DOCUMENTS

| | | |
|---|---|---|
| 2005/0288959 A1 | 12/2005 | Eraker et al. |
| 2008/0086451 A1 | 4/2008 | Torres et al. |
| 2009/0299766 A1 | 12/2009 | Friedlander et al. |
| 2010/0169360 A1 | 7/2010 | Cohen et al. |
| 2010/0251156 A1 | 9/2010 | Cantwell |
| 2010/0299348 A1 | 11/2010 | Gill et al. |
| 2011/0145005 A1* | 6/2011 | Cao ................ G06Q 10/10 705/1.1 |
| 2011/0298804 A1 | 12/2011 | Hao et al. |
| 2013/0007070 A1 | 1/2013 | Pitschke |
| 2013/0091170 A1 | 4/2013 | Zhang et al. |
| 2014/0095549 A1 | 4/2014 | Shi et al. |
| 2014/0207826 A1* | 7/2014 | Gao ................. G06F 16/84 707/803 |
| 2014/0278754 A1 | 9/2014 | Cronin et al. |
| 2014/0278778 A1 | 9/2014 | Regan |
| 2015/0082219 A1 | 3/2015 | Beck et al. |
| 2015/0242407 A1 | 8/2015 | Frohock et al. |
| 2015/0310005 A1 | 10/2015 | Ryger et al. |
| 2016/0092530 A1 | 3/2016 | Jakubiak et al. |
| 2016/0092594 A1 | 3/2016 | Deshmukh et al. |
| 2016/0180439 A1 | 6/2016 | Sherman |
| 2016/0224594 A1* | 8/2016 | Chow ............. G06F 16/2237 |
| 2016/0275134 A1 | 9/2016 | Tandel et al. |
| 2017/0052747 A1 | 2/2017 | Cervelli et al. |
| 2017/0068712 A1 | 3/2017 | Streufert et al. |
| 2017/0068718 A1* | 3/2017 | Schaffer ............. G06F 16/27 |
| 2017/0161341 A1 | 6/2017 | Hraboysky et al. |
| 2017/0177792 A1 | 6/2017 | Majumdar et al. |
| 2017/0248944 A1 | 8/2017 | Rath et al. |
| 2017/0262440 A1 | 9/2017 | Horowitz et al. |
| 2017/0286532 A1 | 10/2017 | Horowitz et al. |

* cited by examiner

SYSTEM AND INTERFACES FOR PERFORMING DOCUMENT VALIDATION IN A NON-RELATIONAL DATABASE

RELATED APPLICATIONS

This Application claims the benefit under 35 U.S.C. § 120 of U.S. application Ser. No. 15/223,654, entitled "SYSTEMS AND METHODS FOR MODELLING VIRTUAL SCHEMAS IN NON-RELATIONAL DATABASES" filed on Jul. 29, 2016, which is herein incorporated by reference in its entirety. Application Ser. No. 15/223,654 claims priority under 35 U.S.C. § 119(e) to U.S. Provisional Application Ser. No. 62/355,470, entitled "SYSTEMS AND METHODS FOR MODELLING VIRTUAL SCHEMAS IN NON-RELATIONAL DATABASES" filed on Jun. 28, 2016, which is herein incorporated by reference in its entirety. Application Ser. No. 15/223,654 claims priority under 35 U.S.C. § 119(e) to U.S. Provisional Application Ser. No. 62/262,942, entitled "SYSTEMS AND METHODS FOR MODELLING VIRTUAL SCHEMAS IN NON-RELATIONAL DATABASES" filed on Dec. 4, 2015, which is herein incorporated by reference in its entirety. This Application claims priority under 35 U.S.C. § 119(e) to U.S. Provisional Application Ser. No. 62/341,485, entitled "SYSTEM AND INTERFACES FOR PERFORMING DOCUMENT VALIDATION IN A NON-RELATIONAL DATABASE" filed on May 25, 2016, which is herein incorporated by reference in its entirety.

NOTICE OF MATERIAL SUBJECT TO COPYRIGHT PROTECTION

Portions of the material in this patent document are subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

SUMMARY

It is appreciated that existing databases are not easily adaptable to changes. For instance, in conventional relational databases, they typically employ a static schema format that generally requires redesign of any related applications. Thus, schema design generally is performed first, followed by application design. Schema changes performed after application development can involve additional development and testing resources.

It is appreciated that it would be highly desirable the ability to start application development without first needing to define a formal schema. Further, it would be desirable for operations teams to have the ability to avoid time-consuming schema upgrade operations every time the developers need to store a different attribute within the database. Such an ability may permit, for example, operations teams to launch new features in hours rather than weeks. For business leaders, the application gets launched much faster, and new features can be rolled out more frequently.

Further, it would be desirable for certain non-relational database systems to have the ability to create schemas for their associated databases that do not currently employ a rigid schema. For instance, it may be desirable to begin creating a schema that can be imposed on an existing database of documents. Also, it is appreciated that many projects reach a point where it may be necessary to enforce rules on what can be stored in the database—for example, that for any document in a particular collection, it can be assured that certain attributes are present. In conventional systems, it would be required that developers would need to build in their own validation and error control logic into their applications, or use some middleware solution. This is further complicated in that multiple development languages may be used, and it may be difficult to coordinate between these different languages.

According to one aspect, a system is provided that includes a document validator that reviews documents within a non-relational database according to one or more validation rules. The document validator may be incorporated within the database engine and may perform document validation when one or more database functions are performed. For instance, the document validator may review the formats of entries when one or more documents are added to the database and/or when a update is performed. The document validator may also perform validations in a batch mode, and may identify documents that do not match particular validator rules.

The system may be combined with a component that identifies and defines a schema on an existing set of documents. In this way, the schema may change over time, and a validator that is flexible for imposing certain structures on one or more document collections may be beneficial for creating adaptive applications. This capability also permits changes to an application without breaking a static model architecture.

According to one aspect a distributed computer system is provided. The system comprises a non-relational database engine including a validator component, and a database collection including a plurality of documents; and wherein the validator component is adapted to selectively validate one or more elements of a document of the database collection. According to one embodiment, the system further comprises a schema identification component that is adapted to identify, from the plurality of documents, a schema to be used for accessing the plurality of documents. According to one embodiment, the system further comprises a set of validation rules, and wherein the validator component is adapted to selectively validate one or more documents of the plurality of documents. According to one embodiment, the system further comprises an interface that indicates, for at least one of the plurality of documents, whether the at least one document did not match at least one of the set of validation rules. According to one embodiment, the system further comprises a control that validates all of the documents within the database collection. According to one embodiment, the validator component is adapted to selectively validate one or more elements of at least one document of the database collection responsive to an update of the at least one document.

According to one embodiment, the validator component is adapted to apply a validation rule responsive to the update. According to one embodiment, the validator component is adapted to perform a match negation operation of the validation rule responsive to the update. According to one embodiment, the validator component is adapted to return an indication that the application of the validation rule to the at least one document failed. According to one embodiment, the validator component is adapted to apply a validation rule responsive to at least one database operation involving a write operation to an existing document of the database collection. According to one embodiment, the validator component is adapted to operate in a plurality of selectable modes, including, an inoperable mode, a moderate operating mode, and a strict mode. According to one embodiment, the validator component is adapted to receive a plurality of user-defined validation rules and is adapted to selectively apply the plurality of user-defined validation rules to the database collection. According to one embodiment, the schema identification component is adapted to identify, from a subset of the plurality of documents, a schema to be used for accessing the plurality of documents. According to one embodiment, the schema identification component is adapted to identify, among the subset of the plurality of documents, a plurality of common attributes. According to one embodiment, the schema identification component is adapted to sample the plurality of documents using at least one predefined sampling technique.

According to one aspect a non-volatile computer-readable medium encoded with instructions for execution on a computer system is provided. The instructions when executed, provide a system comprising a non-relational database engine including a validator component, and a database collection including a plurality of documents, and wherein the validator component is adapted to selectively validate one or more elements of a document of the database collection. According to one embodiment, the system further comprises at least one user interface control that when selected, causes the interface to a schema identification component that is adapted to identify, from the plurality of documents, a schema to be used for accessing the plurality of documents. According to one embodiment, the computer readable medium according to claim 16, further comprises a set of validation rules wherein the validator component is adapted to selectively validate one or more documents of the plurality of documents. According to one embodiment, the computer readable medium according to claim 18, further comprises an interface that indicates for at least one of the plurality of documents, whether the at least one document did not match at least one of the set of validation rules. According to one embodiment, the system further comprises a control that validates all of the documents within the database collection. According to one embodiment, the validation component is adapted to selectively validate one or more elements of at least one document of the database collection responsive to an update of the at least one document.

According to one embodiment, the validator component is adapted to apply a validation rule responsive to the update. According to another embodiment, the validator component is adapted to perform a match negation operation of the validation rule responsive to the update is adapted to return an indication that the application of the validation rule to the at least one document failed. According to another embodiment, the validator component is adapted to apply a validation rule responsive to at least one database operation involving a write operation to an existing document of the database collection. According to another embodiment, the validator component is adapted to operate in a plurality of selectable modes, including an inoperable mode, a moderate operating mode, and a strict mode. According to another embodiment, the validator component is adapted to receive a plurality of user-defined validation rules and is adapted to selectively apply the plurality of user-defined validation rules to the database collection.

According to another embodiment, the system is adapted to identify, from a subset of the plurality of documents, a schema to be used for accessing the plurality of documents. According to another embodiment, the system is adapted to identify is adapted to identify, among the subset of the plurality of documents, a plurality of common attributes. According to another embodiment, the system is adapted to sample the plurality of documents using at least one predefined sampling technique.

According to one aspect, a system is provided. The system comprises at least one processor operatively connected to a memory, the processor, when executed being configured to: accept a specification of a subset of data or an entire data set of a non-relational database; select data from the subset of the data or the entire data set to create sampled data; and identify a plurality of common attributes within the sample data to build a virtual schema from the sampled data; and a validation component, executed by the at least one processor, configured to: generate a plurality of database validation rules based on the virtual schema; and validate one or more elements of a document of the non-relational database according to the plurality of database validation rules.

According to one embodiment, the validation component is further configured to indicate whether the document does not meet at least one of the plurality of database validation rules. According to another embodiment, the validation component is further configured to validate a new document during a process of inserting the new document into the non-relational database. According to another embodiment, the validation component is further configured to reject the new document if the document does not meet at least one of the plurality of database validation rules from being added to the non-relational database.

According to one embodiment, the validation component is further configured to validate the one or more elements of the document responsive to an update of the document. According to another embodiment, the validation component is further configured to apply a validation rule responsive to the update. According to another embodiment, the validation component is further configured to return an indication that the application of the validation rule to the document failed.

According to one embodiment, the validation component is further configured to receive a plurality of user-defined validation rules and is configured to selectively apply the plurality of user-defined validation rules to the subset of data or the entire data set. According to another embodiment, the validation component is further configured to reject the update to the document if the update violates at least one of the plurality of database validation rules. According to another embodiment, the validation component is further configured to query and fix existing documents in the non-relational database. According to another embodiment, the validation component is further configured to query and fix the existing documents in the non-relational database responsive to an update to the validation rules. According to another embodiment, the validation component is further configured to update the validation rules responsive to a change in the virtual schema.

According to one embodiment, the validation component is configured to operate in a plurality of selectable modes, including: an inoperable mode; a moderate operating mode; and a strict mode.

According to one embodiment, the processor is configured to randomly sample the subset of data or the entire data set to create the sampled data. According to another embodiment, the processor is configured to selectively sample the subset of data or the entire data set. According to another embodiment, the processor is configured to sample the subset of data or the entire data set until a confidence level received from a user is met.

According to one embodiment, the system is configured to receive the specification of the subset of data or the entire data set from a user. According to another embodiment, the system is configured to identify the plurality of common attributes within the sampled data based on a ranked order of the attributes.

According to one aspect, a computer-implemented method is provided. The method comprises accepting, by at least one processor, a specification of a subset of data or an entire data set of a non-relational database; selecting, by the at least one processor, data from the subset of the data or the entire data set to create sampled data; identifying, by the at least one processor, a plurality of common attributes within the sample data; building, by the at least one processor, a virtual schema from the sampled data using the identified plurality of common attributes; generating, by a validation component, a plurality of database validation rules based on the virtual schema; and validating, by the validation component, one or more elements of a document of the non-relational database according to the plurality of database validation rules.

According to one embodiment, the method further comprises validating, by the validation component, a new document during a process of inserting the new document into the non-relational database. According to another embodiment, the method further comprises rejecting, by the validation component, the new document from being added to the non-relational database if the document does not meet at least one of the plurality of database validation rules. According to another embodiment, the act of validating comprises validating the one or more elements of the document responsive to an update of the document. According to another embodiment, the method further comprises rejecting, by the validation component, the update to the document if the update violates at least one of the plurality of database validation rules.

According to one embodiment, the method further comprises receiving, by the validation component, a plurality of user-defined validation rules and selectively applying the plurality of user-defined validation rules to the subset of data or the entire data set. According to another embodiment, the method further comprises querying and fixing, by the validation component, existing documents in the non-relational database. According to another embodiment, the method further comprises updating, by the validation component, the validation rules responsive to a change in the virtual schema.

According to one embodiment, the method further comprises operating, by the validation component, in a plurality of selectable modes including an inoperable mode, a moderate mode, and a strict mode. According to another embodiment, the act of selecting includes randomly sampling, by the at least one processor, the subset of data or the entire data set to create the sampled data. According to another embodiment, the act of selecting includes sampling, by the at least one processor, the subset of data or the entire database until a confidence level received from a user is met. According to another embodiment, the act of identifying the plurality of common attributes includes identifying the plurality of common attributes based on a ranked order of the attributes.

According to one aspect, a non-transitory storage medium storing processor-executable instructions is provided. The instructions, when executed, perform a method that comprises accepting a specification of a subset of data or an entire data set of a non-relational database; selecting data from the subset of the data or the entire data set to create sampled data; identifying a plurality of common attributes within the sampled data; building a virtual schema from the sampled data using the identified plurality of common attributes; generating a plurality of database validation rules based on the virtual schema; and validating one or more elements of a document of the non-relational database according to the plurality of database validation rules.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

According to one implementation, a system is provided that is capable of validating documents in a non-relational database, such as a NoSQL database. For instance, it is appreciated that there may be difficulty in developing and maintaining database applications for document collections that have ever-changing documents and schemas. According to one embodiment, a database validator is provided that is capable of inspecting one or more documents of a collection over one or more validation rules. Such rules may, according to one embodiment, be provided by a developer to ensure that documents of the collection are in conformance with a particular database format that may change over time.

According to another implementation a system is provided that is capable of building a virtual schema for a non-relational database and then validating documents in the database according to the virtual schema. It is appreciated that virtual schema that provide a view of a non-relational database may change regularly with changes in data and applications associated with the data. According to one embodiment, a system is provided that is capable of generating validation rules based on a new or updated schema and then inspecting one or more documents of a collection using the validation rules. Such updated rules may ensure that documents of a non-relational database and/or collection are well-represented by a virtual schema that may change over time.

Figure 1:
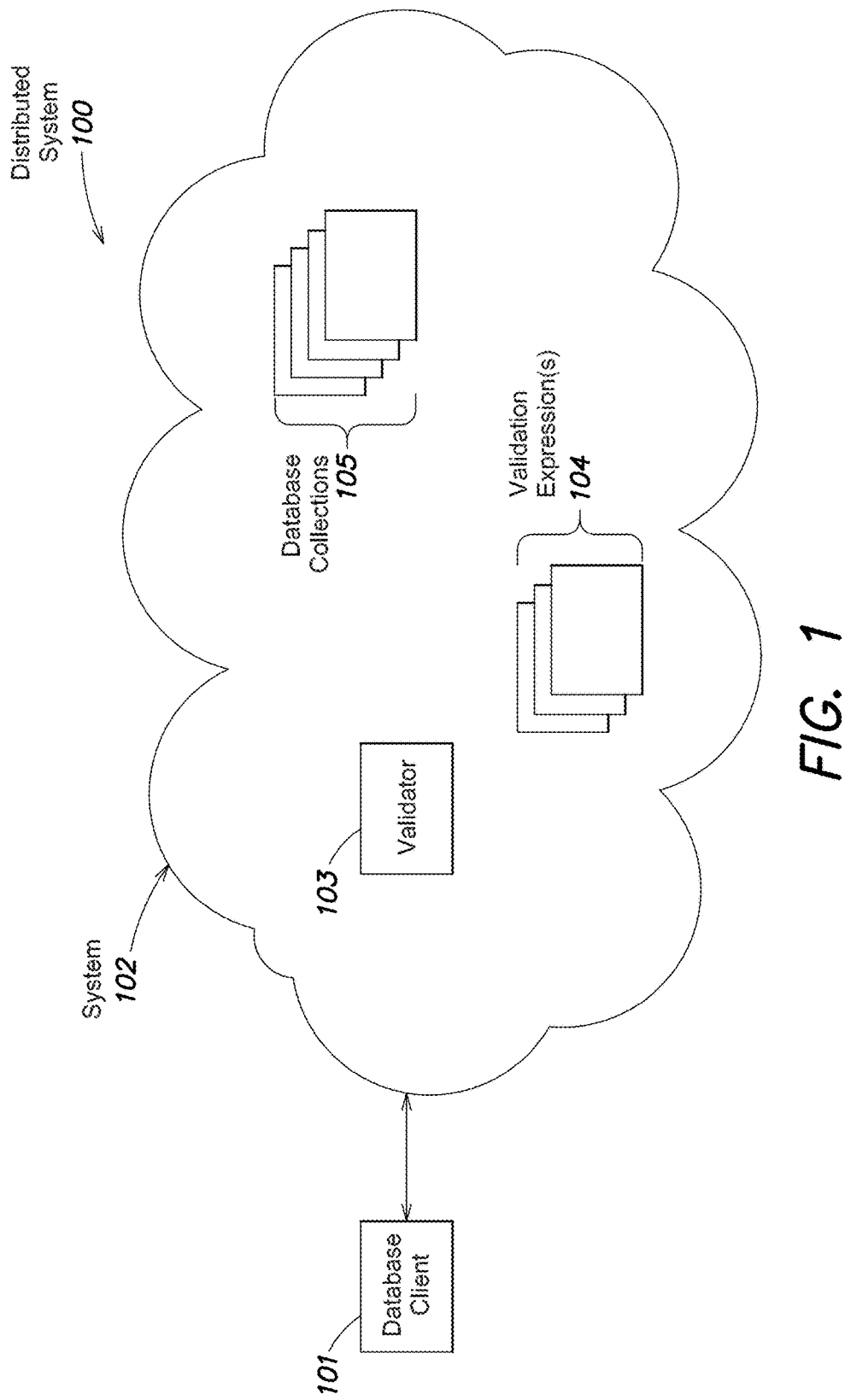
FIG. 1 shows a block diagram of a distributed computer system capable of implementing various aspects of the present invention.

FIG. 1 shows a block diagram of a distributed computer system 100 capable of implementing various aspects of the present invention. In particular, distributed system 100 includes a database client 101 and a distributed database system 102. Such a client 101 may be any type of client system, such as a desktop system, mobile device, application or any other data processing entity capable of interacting with a database.

System 102 may also include a validator 103 that is capable of validating a format of one or more database entities within one or more database collections 105. Validator 103 may be capable of evaluating a database entity against one or more validation rules or expressions 104. According to one embodiment, a user may define one or more validation expressions that may be used to validate documents. For instance, documents may be inspected to determine whether a particular parameter resides within a certain range of values, exists within the document, or fulfills some other requirement. In one embodiment, the user is provided controls to allow the user to administer change control for particular database collections. Such controls may prove useful for modifying and checking the schema for a non-relational database.

Figure 2:
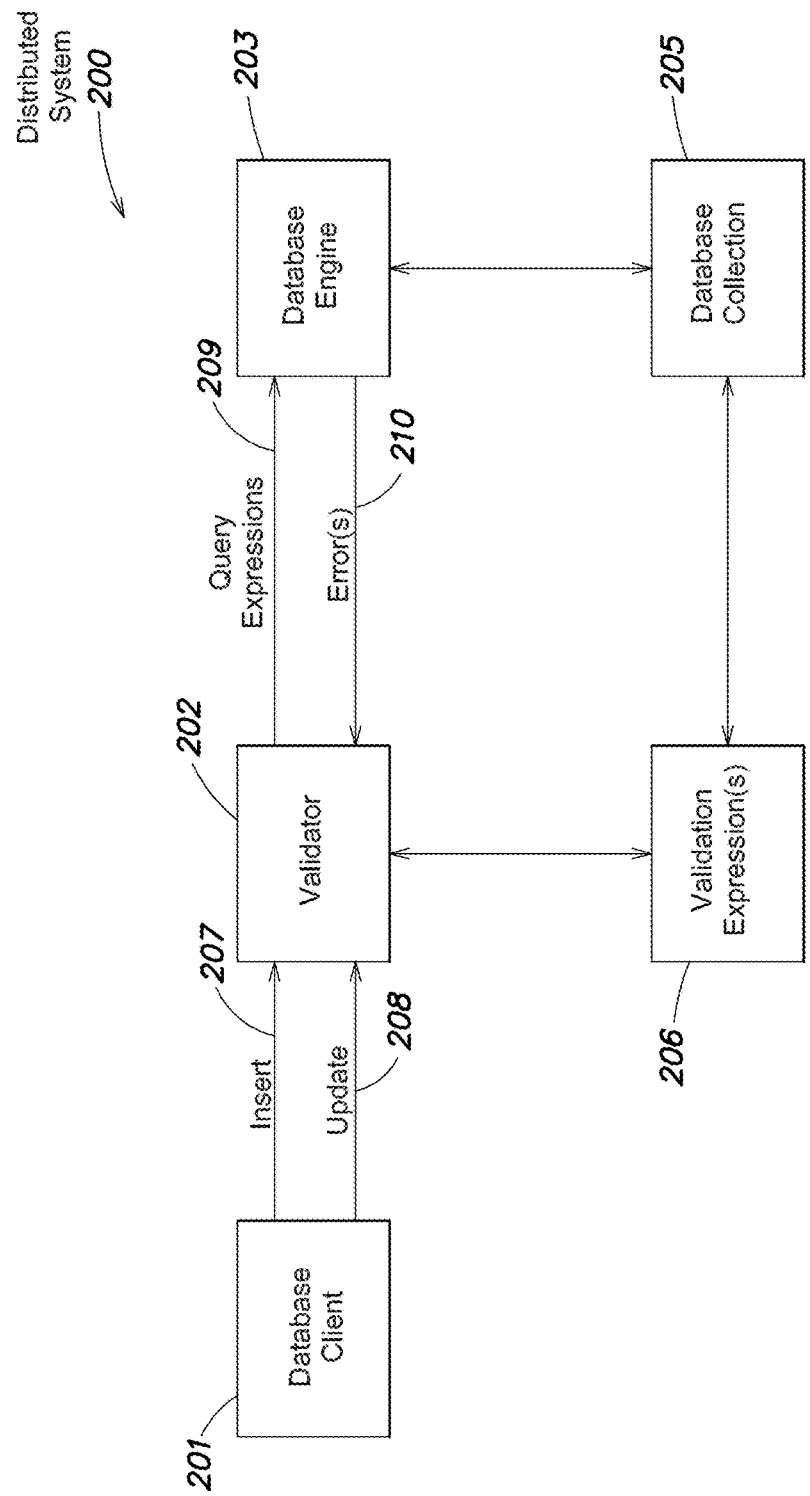
FIG. 2 shows an example block diagram of a distributed computer system according to one embodiment of the present invention.

FIG. 2 shows an example block diagram of a distributed computer system 200 according to one embodiment of the present invention. In particular, system 200 includes a database client 201 that interfaces with a database engine (e.g., database engine 203) for the purpose of accessing one or more database collections (e.g., database collection 205).

According to one aspect, a validator (e.g. validator 202) is provided that is capable of validating particular objects in the database (e.g., a document within a non-relational database) responsive to particular operations. In one embodiment, the validator works within a normal API used for accessing database functions. In particular, when a database client performs either an insert (e.g. insert 207) or an update (e.g., update 208) operation, the validator uses one or more validation expressions 206 to determine whether a particular database object passes a validation step.

For example, in one implementation, a database object passes a validation step when it matches the tested and validation expression. If the database object being operated on passes the validation step, the operation is submitted and performed by the database engine 203. If the validation step does not pass, the validator may return an error (e.g., to the database client). Alternatively, the database may detect and report the error. In another embodiment, the validator 202 may operate in a number of different operational states where different levels of validation may be performed. For instance, it may be desired to add one or more documents to the collection without having a validation step performed (e.g., during the development phase).

Figure 3:
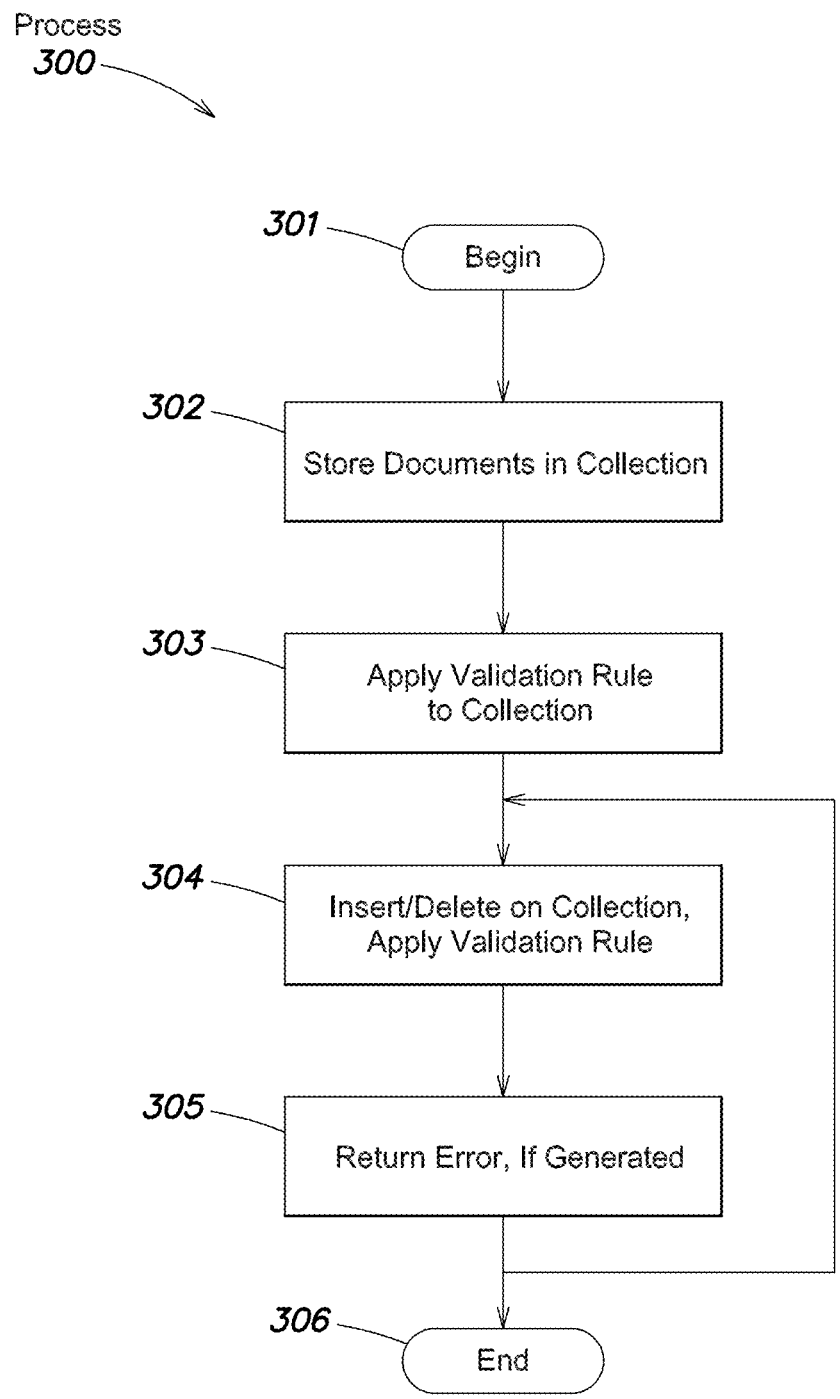
FIG. 3 shows an example process for validating documents in a collection according to one embodiment of the present invention.

FIG. 3 shows an example process 300 for validating documents in a collection according to one embodiment of the present invention. For example, process 300 may be performed by distributed system 200 as discussed above with reference to FIG. 2. At block 301, process 200 begins. At block 302, the system stores one or more documents within the database collection. For instance, this may be performed during an initial creation of the database or by some other operation. At some later time, at block 303, maybe desire to apply a particular validation rule to the collection. For instance, there may be some functionality added that utilizes an index that should apply to all documents within a particular collection.

At such a point, a validator (e.g., validator 202) may perform validation operations in the stream of regular database operations. For example, validator 202 may, responsive to an insert or deletion on the collection, apply a particular validation rule or set of validation rules. At block 305, the validator may return an error, if generated by the application of the validation rules to one or more documents of the collection. At block 306, process 300 ends.

Figure 4:
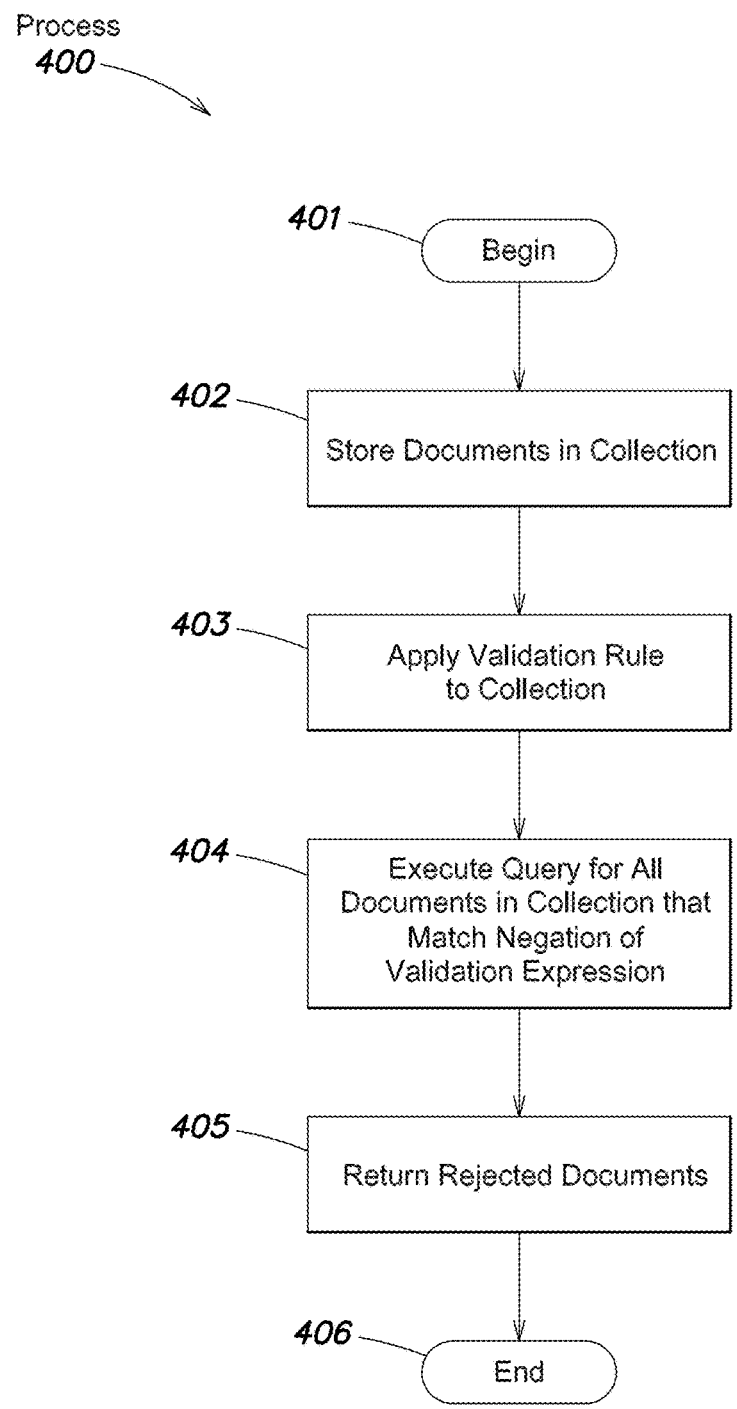
FIG. 4 shows an example process for identifying rejected documents based on one or more validation rules according to various embodiments of the present invention.

FIG. 4 shows an example process 400 for identifying rejected documents based on one or more validation rules according to various embodiments of the present invention. At block 401, process 400 begins. At block 402, the system stores documents within a collection. For instance, as discussed above, a non-relational database system may store one or more documents within storage associated with a collection. At block 403, the system may apply a validation rule to the store collection. In one example implementation, a validation rule may be defined that determines an existence, format, and/or value of an element within a particular document or document set. In one example implementation, may be beneficial to validate multiple documents within a particular collection (e.g., all of them) for the purpose of developing additional functionality with the collection (e.g., adding an index, additional search field, etc.).

At block 404, the system executes a query for all documents within the collection that matches a negation of a particular validation expression. For example, the user may create a validation expression to validate a product identifier (product_id) within a particular set of documents and that the identifier has a particular format. For instance, it is appreciated that if product_id is used as an index or otherwise is a search term (e.g., the field product_id is added to an application as a search field), and particular documents are either missing the product_id or it is not within a searchable range, the document will not be returned as a result of the search. In one implementation, a document validator may be used to determine which documents cannot be located within the collection, and those documents may be fixed or otherwise revised to include the product_id information.

At block 405, the validator may return an indication of all of the rejected documents that do not match the search expression. Afterwards, these documents may be edited or otherwise revised to include the correct information.

Figure 5:
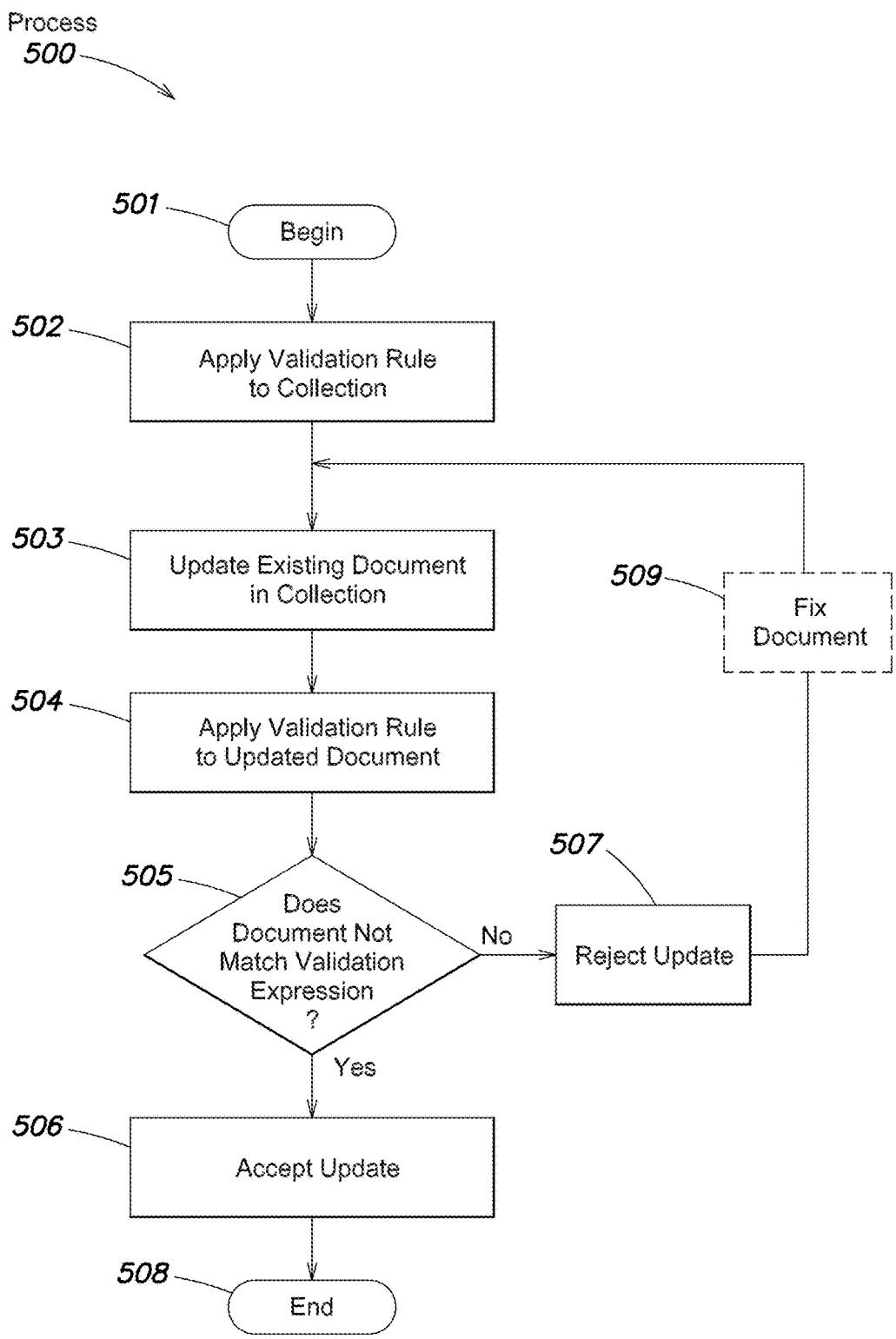
FIG. 5 shows a process for validating documents upon an update operation according to one embodiment of the present invention.

FIG. 5 shows a process 500 for validating documents upon an update operation according to one embodiment of the present invention. As discussed above, a validator may be provided that operates in line to perform validation operations during normal database operations such as an update. At block 501, process 500 begins. At block 502, the system lies validation rule to the database collection. At block 503, the system updates an existing document from the collection. At block 504, a validator applies a validation rule to the updated document. At block 505, it is determined whether the document does not match the validation expression. If not, the system rejects the update block 507. Optionally, the system may fix the document at block 509, or the document may be fixed manually by the user. However, if the document does match the validation expression, it is determined that the document is valid, and the update is except block 506. At block 508, process 500 ends.

Figure 6:
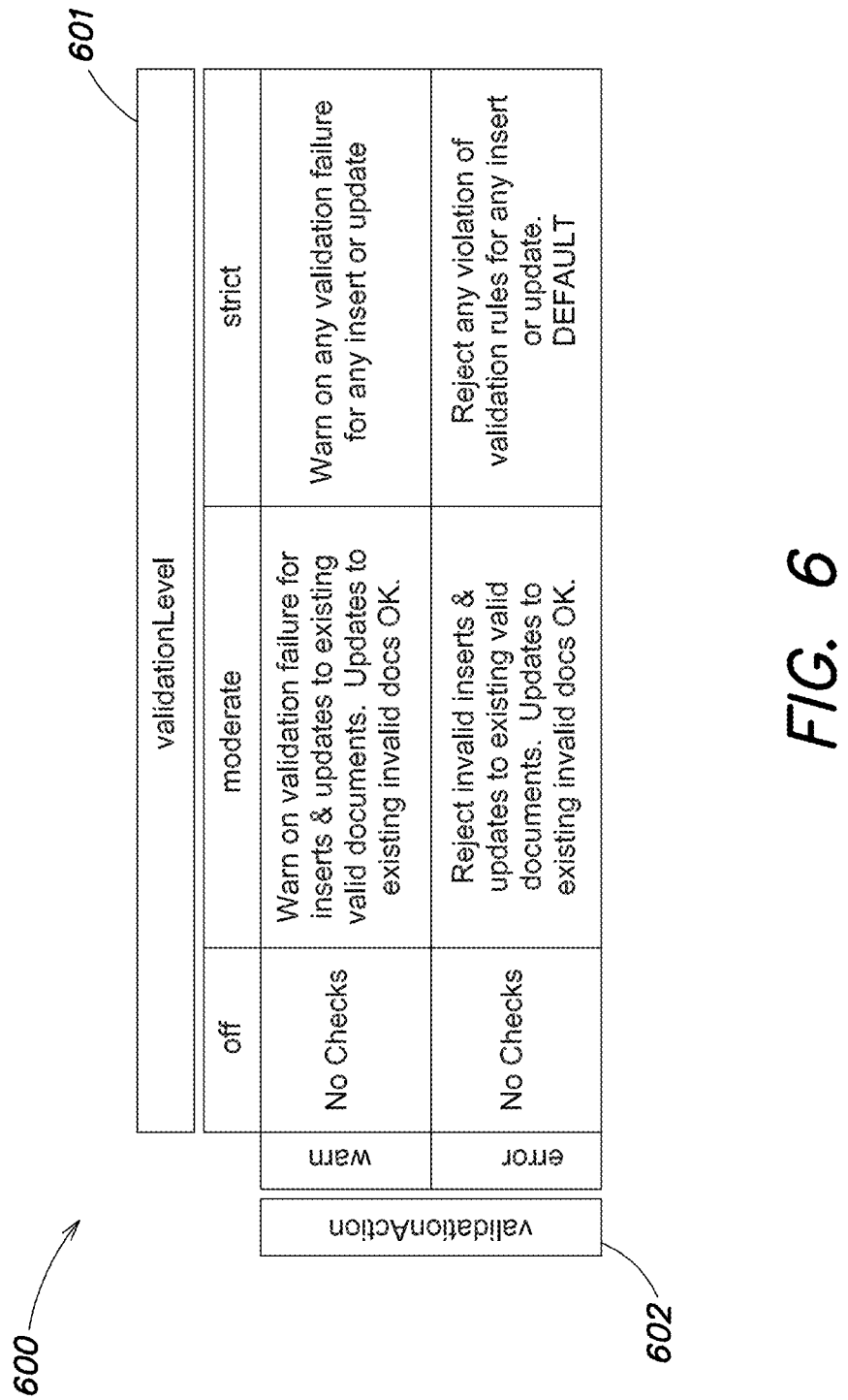
FIG. 6 shows another example state implementation of a validator according various aspects of the present invention.

FIG. 6 shows another example state implementation of a validator according various aspects of the present invention. In particular, the validator may include one or more operational states and actions as identified within table 600. For instance, the validator may have one or more validation levels 601, and one or more validation actions 602. For instance, according to the implementation shown in table 600, if the validation level of the validator is off, no checks are performed on database operations performed collection.

For instance, this functionality may be desired when the document collection is stagnant, and the previous validation operation was performed to ensure that all documents are valid. Further, such an operating condition may be used when accessing a read-only database or a database that has a mode set to read-only.

The validator may have a moderate validation level wherein the system either warns or rejects for invalid inserts and updates to the collection of existing valid documents. However according to one embodiment, the validator may permit updates to existing invalid documents. In this moderate validator setting, it may be desired to have function that does not create additional invalid documents, but permits updates to invalid documents within the collection.

In a strict validation mode, the validator may warn or reject any validation failure of any validation rules for any insert or update. According to one embodiment, to ensure that future additions and changes to the database are compliant, a validator default mode may produce an error when a violation of any of the validation rules for an insert or update occurs.

Figure 7:
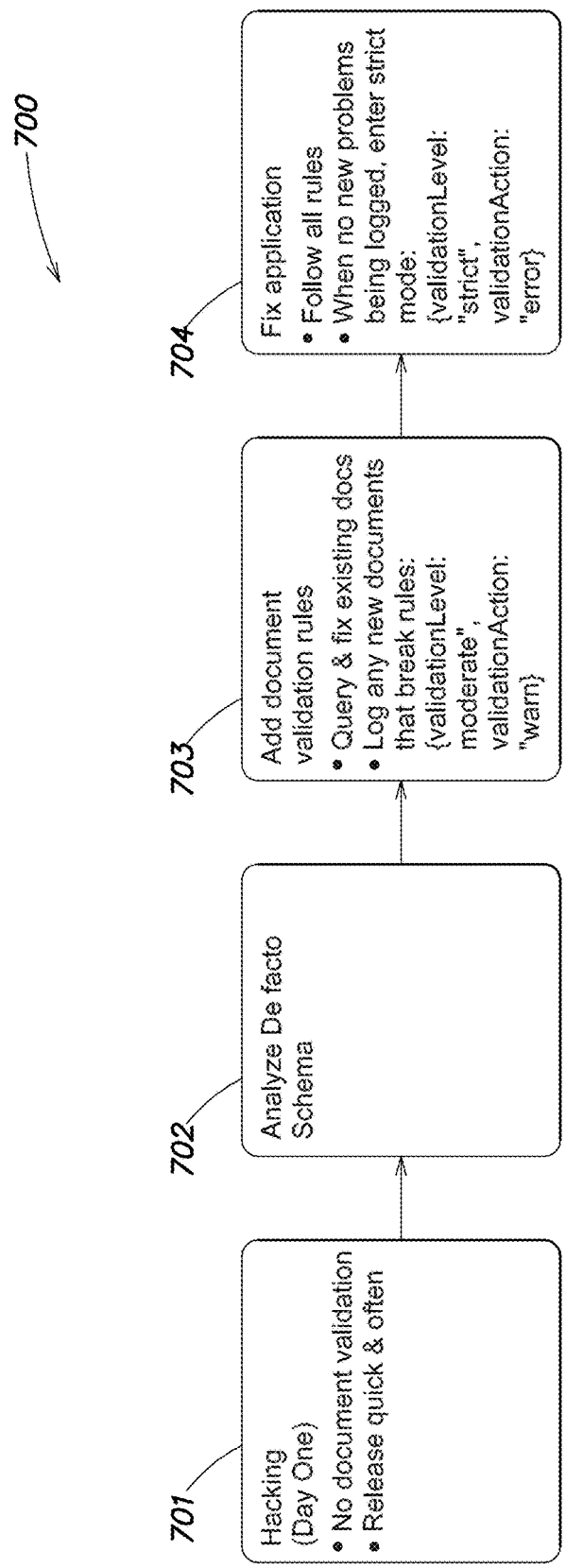
FIG. 7 shows an example use of a validator according to various aspects of the present invention.

FIG. 7 shows an example use of a validator according to various aspects of the present invention. For instance, in a practical example, it may be helpful to have a database programming environment that is flexible and enforces constraints on as little or as much of the schema as required. That is, it may be beneficial to have an environment that includes a dynamic schema for rapidly changing, polymorphic data, with the option to enforce strict validation checks against specific attributes from the onset of a project, or much later on. If initially there are no validations defined, the system may be adapted to permit the addition of validation checks later, even when the application is in production, and operates across thousands of servers.

In particular, FIG. 7 shows an example implementation 700 including an example timeline of how one application might be developed. For instance, at block 701 (day one and after), programmers create an application where there is no document validation and upgrades are released quickly and often. During this period, additional documents may be added to the database, and updates may be performed that do not necessarily conform to any particular schema.

At block 702, an analyzer is used to determine an optimal schema that may be used within the database. For example, a schema that uses statistical analysis to determine what facets may exist within a particular database may be used, and a programmer or other developer may select particular database elements to use as search criteria or indices. For instance, according to various embodiment, a schema analysis system as described in U.S. application Ser. No. 15/223,654 filed Jul. 29, 2016, entitled SYSTEMS AND METHODS FOR MODELLING VIRTUAL SCHEMAS IN NON-RELATIONAL DATABASES," incorporated by reference herein to which priority is claimed, may be used with a validator according to various embodiments. In particular, such a system may be used to identify and define a schema for use in accessing a non-relational database. In one example, a probabilistic data model may be derived from a particular document collection. Schema information may be developed, for example, from a subset of all documents in the collection, and it should be appreciated that all the documents may not be perfect in that their content includes all information defined by the identified schema. Further, it may not be feasible to sample all documents (e.g., a collection of 10,000 documents), so such a tool may be beneficial in determining a representative schema. Thus, with use of the validator according to various embodiments, certain schema elements can be tested within the documents to determine documents that may need to be improved or fixed.

At block 703, the system may use this identified schema and a user may add document validation rules to query and fix existing documents within the collection. Further, the document validator may log any new documents that break the current validation rules. As discussed above, the validator may run in a moderate state wherein documents that do not conform produce warnings. At block 704, the application may be fixed to the point at which documents are required to follow all rules, and when no new problems are being logged, the validator enters a strict validation mode wherein any new documents or updates that are not in conformance produces an error. Therefore, the validator provides a transition point from a schema-less version of the application and database to a database having validation checking.

Figure 8:
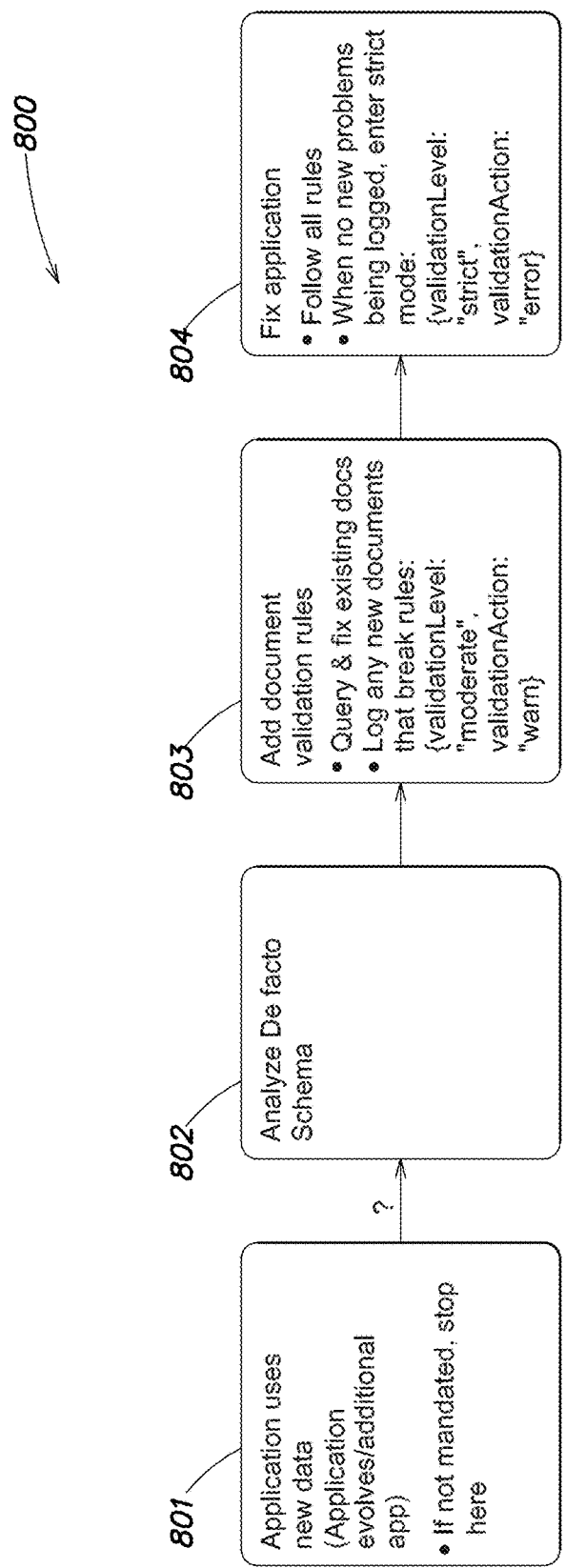
FIG. 8 shows another example use of a validator according to one embodiment of the present invention.

FIG. 8 shows another example use 800 of a validator according to one embodiment of the present invention. For example, at block 801, the application uses new data such as when the application evolves or the application includes additional functionality. Of course, as applications evolve, they may require additional pieces of data and it may be desirable to add to documentation validation rules to check that this additional data is included and checked.

For example, at black 801, is determined that additional data which may include additional validation rules may be used. At block 802, the modified database may be reanalyzed with a schema analyzer as discussed above. After a new schema is created, additional documentation validation rules may be added at block 803. For instance, these new additional validation rules may apply to existing documents that passed previous document validation rule sets. In one embodiment, the validator queries and fixes existing documents, and logs any new documents that break the rules according to a moderate operating level as discussed above. At block 804, the system is used to fix the application in the data sets. After which, the validator follows all rules, and when there are no new problems being logged, the validator enters a strict validation mode.

Figure 9:
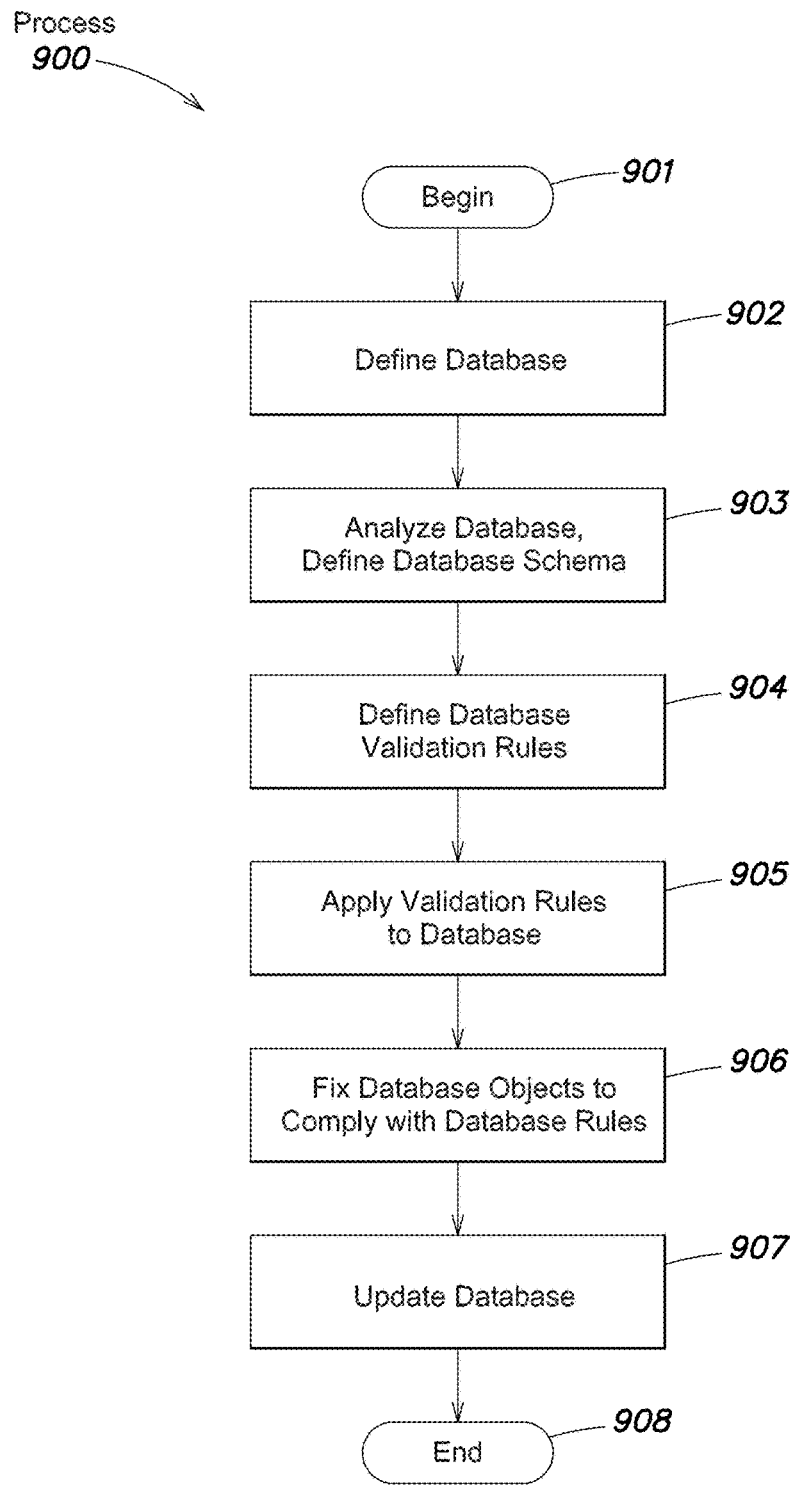
FIG. 9 shows an example implementation of a validator used to identify and fix database objects according to one embodiment of the present invention.

FIG. 9 shows an example implementation of a validator and process 900 used to identify and fix database objects according to one embodiment of the present invention. At block 901, process 900 begins. At block 902, the system defines a database including a collection of one or more documents. At block 903, the system analyzes the database and defines a database schema as discussed above. At block 904, the system defines database validation rules. This may be performed, for example, by analyzing information from the schema in determining the existence of particular database elements within a predominant portion of the document database. Further, a user may define particular acceptable ranges or values for particular database elements.

Block 905, the system applies the validation rules to the database. At block 906, the system fixes the database objects to comply with the defined database rules. At block 907, the system updates the database with these fixes. After which, the system includes a compliant database collection, and the process ends at block 908. This process may be performed in a number of times with an existing database and/or application as they change over time.

Figure 10:
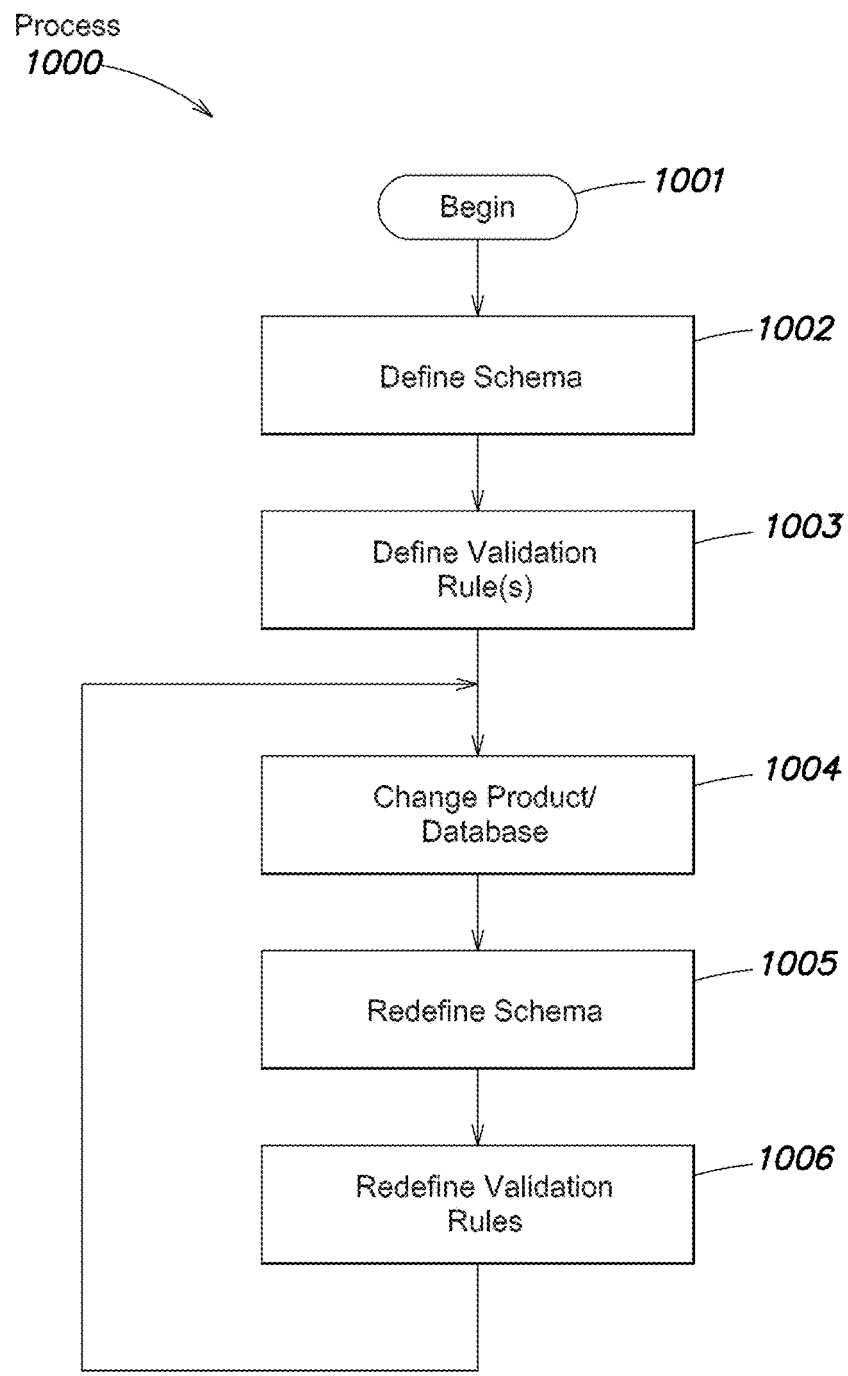
FIG. 10 shows an example schema change process using a validator according to one embodiment of the present invention.

FIG. 10 shows an example schema change process 1000 using a validator according to one embodiment of the present invention. At block 1001, process 1000 begins. At block 1002, the system defines a schema for the document database. For example, this may be done using an analysis tool as discussed above. At block 1003, the system defines one or more validation rules that are associated with the database collection.

In a change to an application, product, or underlying database, at block 1004, the schema may be redefined block 1005. After which, one or more validation rules may be redefined at block 1006, wherein validation rules may be edited, added, deleted or other changes made. The system may rerun validation checking on the document database to determine whether one or more documents complied with the validation rules. These documents may be fixed, and the validator may be transitioned to a strict mode to check new document updates and additions.

Figure 11:
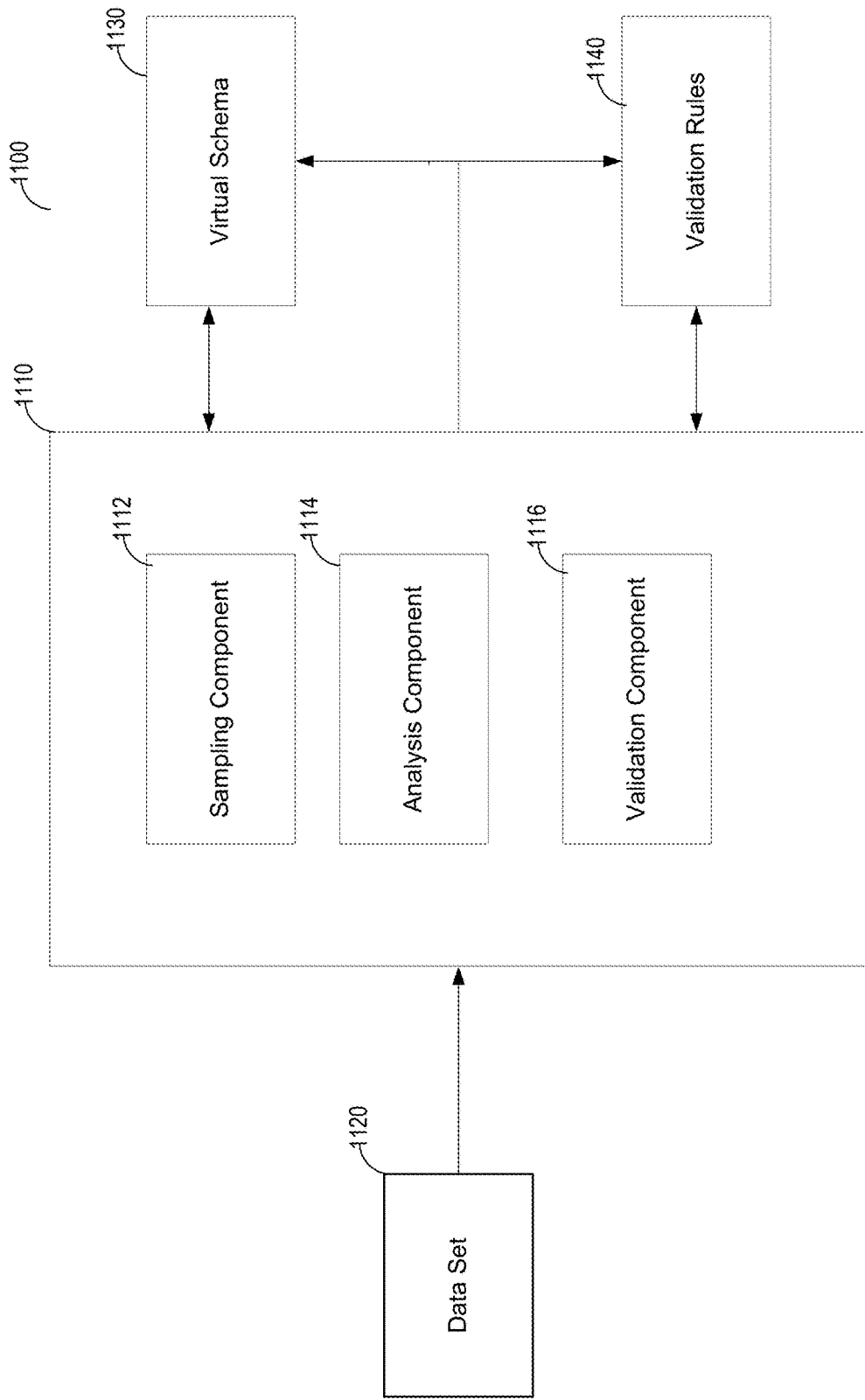
FIG. 11 shows an example block diagram of a computer system for implementing various aspects of the present invention.

FIG. 11 shows an overview 1100 of a system 1110 for analyzing a data set, building a virtual schema for the dataset, and validating elements in the dataset. According to one embodiment, the system 1110 accesses a data set 1120, samples the data set 1120 for analysis, synthesizes a virtual schema based on attributes of the sample set, and generates validation rules with which it validates the data set 1120. The virtual schema may comprise a model of the architecture of the data in the database. The virtual schema can, for example, include a probabilistic model of the data in the database.

According to one embodiment, after the system 1110 accesses the data set 1120, the system selects a set of sample data for further analysis. In one example, the system 1110 can receive user input specifying filters, selections, and other criteria from which the system 1110 may use to adjust its selection of sample data. In another embodiment, the system 1110 may analyze an entire database based and select elements of the database. The system 1110 may, for example, identify a particular collections of documents based on common usage or common attributes.

In some embodiments, the data set 1120 may be too large to execute analysis computations efficiently. In this case, the system 1120 may utilize user inputs specifying a filter to reduce the quantity of data being analyzed. In another example, the system 1120 may receive user input specifying a particular collection of documents in the database. Additionally or alternatively, the system 1120 may include a sampling component 1112 that is configured to execute data sampling functions. The sampling component 1112 may be configured to use a variety of methods to sample data from data set 1120. The sampling component 1112 may, for example, be configured to randomly sample a specified number of documents from the data set 1120 (e.g. 100 documents, 1,000 documents, etc.). In another example, the sampling component 1112 may randomly select a random number of documents from the data set 1120. Additionally or alternatively, the system 1110 may receive user input identifying specific documents to select.

The inventors have appreciated that it may be desirable to use a sample of data that is representative of the database from which it is derived. In some embodiments, the sampling component 1112 may recursively evaluate sampled data to achieve a desired level of correlation between samples. For example, the sampling component 1112 may collect multiple samples and compare them to calculate a correlation between them. In some embodiments, a higher correlation of samples may indicate a greater probability that the sampled data is representative of the database from which it is derived.

In one embodiment, the system 1110 may accept user input(s) specifying a minimum correlation between samples in order for the system 1110 to consider them an accurate representation of the database from which they are sampled. The system 1110 may, for example, receive a threshold for the number of documents to be sampled by the system. Additionally or alternatively, the system 1110 may receive a confidence threshold for the sampling component 1112 to attain in the sampled data. The sampling component 1112 may take multiple samples until the confidence threshold is achieved. In one example, the sampling component 1112 may select multiple samples, each one containing multiple documents. The samples may vary in composition and number of documents.

In some embodiments, the system 1110 may also include an analysis component 1114. The analysis component may analyze a portion of or all of data set 1120. In one embodiment, the analysis component 1114 is configured to capture information about the sample set and create a virtual schema 1130 or model for the data set 1120, The virtual schema 1130 can be used as a structure for characterizing a data set 1120 of disparate documents, allowing a user to easily evaluate documents that are not intrinsically related by a unifying schema. Furthermore, in some embodiments, a sample set of data from being analyzed may comprise only a portion of the data set 1120 from which it is derised. A user may infer properties about the dataset, which may comprise documents not inherently related by a universal schema, based on data set 1120. The data set 1120 may, for example, comprise a non-relational database or a collection of documents of a non-relational database.

In some embodiments, the analysis component 1114 may be configured to perform multiple operations to generate the virtual schema 1130. The analysis component 1114 may, for example, record the number of times that an attribute appears throughout all of the documents in a data set. Additionally or alternatively, the analysis component 1114 may identify the most commonly-appearing attribute(s) in the data set. In another example, the analysis component 1114 may identify commonly-appearing values throughout the entire data set across every attribute. Further, the analysis component 1114 may identify trends in values of individual attributes.

In some embodiments, the system 1110 may further include a validation component 1116 configured to generate validation rules 1140 and validate elements of a database according to the validation rules 1140. In one embodiment, the validation component 1116 may generate the validation rules according to a virtual schema generated by the analysis component 1114.

In one embodiment, the validation component 1116 may analyze the sample data 1129 in order to generate validation rules. In another embodiment, the validation component 1116 analyzes information from the virtual schema derived from analysis of the data set 1120 in order to generate validation rules. The validation component 1116 may, for example, analyze the virtual schema to determine whether particular database elements exist in the predominant portion of the document database. Additionally or alternatively, the system 1110 may receive user input specifying acceptable ranges or values for particular database elements from which the validation component 1116 may generate validation rules. The validation component 1116 may further validate a format of one or more database entities. In one embodiment, the validation component 1116 may include the validator 202 and one or more of its functionalities described above.

Figure 12:
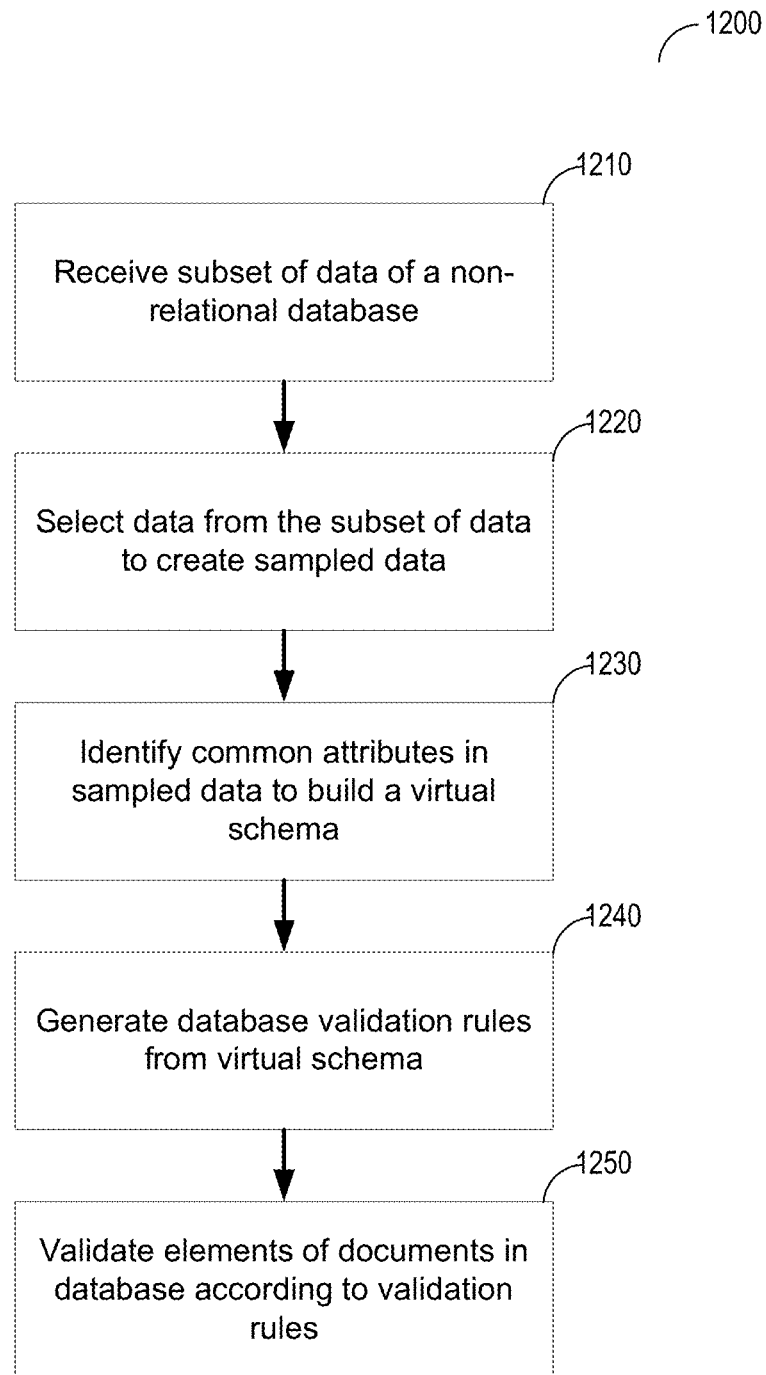
FIG. 12 shows a process for generating a virtual schema and validating documents of a data set according to one embodiment of the present invention.

FIG. 12 shows an example process flow 1200 for analyzing and validating a set of data (e.g. data set 1120). The process flow 1200 can be executed by a system such as exemplary system 1110 discussed above with respect to FIG. 1.

Process flow 1200 begins at act 1210 with receiving a set of data. The data set may comprise a database or a portion of a database. The data set may, for example, comprise of a non-relational database or a collection of documents of a non-relational database.

Next, process flow 1200 proceeds to act 1220 in which the system selects samples from the received data set. In one embodiment, the system may randomly select a number of documents from a non-relational database. For example, the system may receive user input specifying a number of documents to be sampled randomly. In another example, the system may determine a number of documents to select by fine-tuning a threshold associated with a confidence interval that describes the probability that a sample represents the database or data set. The threshold can, for example, be defined by a user to define a minimum certainty desired by the user that a given sample of data accurately represents the data set from which it is derived. Increasing the number of sampled documents will increase the likelihood that the sampled data represents the data set. The system may, for example, continuously increase the number of documents to sample until a threshold of confidence is met. Alternatively, the system may repeat samples until a threshold of confidence is met.

In one example, the system may select a number of documents from a non-relational database to provide a probabilistic view of the database. The selected documents provide a view of the architecture of the database with a certain degree of confidence. In some embodiments, the system may provide visualizations of the sampled data to a user in order to provide a visual representation of the probabilistic model of the database.

In some embodiments, the system may not randomly sample a number of documents from the non-relational database. For example, the system may receive input specifying a particular portion of the data to select. Alternatively, the system may receive criteria that sampled documents must meet in order to be part of the sampled set. A user may, for example, specify a range of creation dates that the sampled documents must meet. This may be particularly useful if the user is attempting to analyze documents added in a certain time range. The system may also accept user input specifying a minimum and/or maximum threshold of correlation between samples in order for the sampled set of data to be acceptable.

Next, the process flow 1200 proceeds to act 1230 in which the system executing the process 1200 identifies common attributes in the sampled data to build a virtual schema. The system may identify attributes that have a high frequency of occurrence in the documents of the sampled data. Additionally or alternatively, the system may identify attributes that have a high probability of having a value. The system may, for example, go through the sample data and record the number of times a given attribute appears. Additionally, the system may analyze values of different attributes and identifies those attributes that have a high variance in their values in order to identify those attributes that most differentiate between documents.

According to some embodiments, by identifying trends in the sampled data, the system may create a model of the sampled data. The model of the sampled data may represent the data set from which the sampled data was derived. The system may then use this model to create a virtual schema. The system may, for example, use trends identified in the data to build the virtual schema. In one example, the system may use the top ranked attributes in terms of frequency to build the virtual schema. In other embodiments, the system may determine appearance boundaries for inclusion in the virtual schema. Thus, the virtual schema provides a view of the database via a probabilistic model.

In some embodiments, the system may incorporate user inputs to tune the generated virtual schema. The user may define criteria for the system to use in defining the virtual schema. In one example, the system may receive input specifying a priority of attributes that have high probability of existing in a document of a non-relational database. In another example, the user may further specify a threshold rate of appearance of an attribute. In some embodiments, the system may receive input specifying a threshold variance in values of attributes that are selected to build the virtual schema.

Next, the exemplary process 1200 proceeds to act 1240 in which it generates validation rules from the created virtual schema. In some embodiments, the system may generate validation rules according to attributes selected to define the virtual schema. The system may, for example, generate validation rules to verify that all documents contain a given attribute. In another embodiment, the system may determine that values of a particular attribute have limits (e.g., minimum, maximum, range). The system may generate a validation rule to check that all documents are within a determine limit. In another example, the system may generate a rule to check format (e.g., data type, string length, number of characters, symbols, etc.) of certain attributes.

In some embodiments, the system may further receive inputs from users specifying additional information for validation rule generation. A user may view a visualization of the virtual schema and decide to implement particular restrictions or limits on documents of a non-relational database. For example, the system may receive user input specifying a particular data format to be enforced for an attribute. In another example, the system may receive user input specifying limits of values for an attribute. The system may also receive a set of attributes that the user requires in every document. The system may use these user inputs to generate validation rules accordingly.

Next, exemplary process 1200 proceeds to act 1250 in which the system validates the data set. The system may use one or more of the generated validation rules to validate elements of documents in the database. In some embodiments, the system may use validation expressions to validate documents as described above. The system may be configured to execute processes such as processes 300, 400, and 500 described above in order to validate documents in a data set (e.g., non-relational database or collection of documents).

In some embodiments, the system may perform validation operations as part of a stream of regular database operations. For example, the system may validate in response to insertion, deletion, and/or modification of a document in the database. In another example, the system may validate documents at a regular time interval. Additionally or alternatively, the system may validate documents responsive to generation or change of a virtual schema. In some embodiments, the result of the validation process may trigger further action such as an error, automatic correction, notification, or other behavior.

Figure 13:
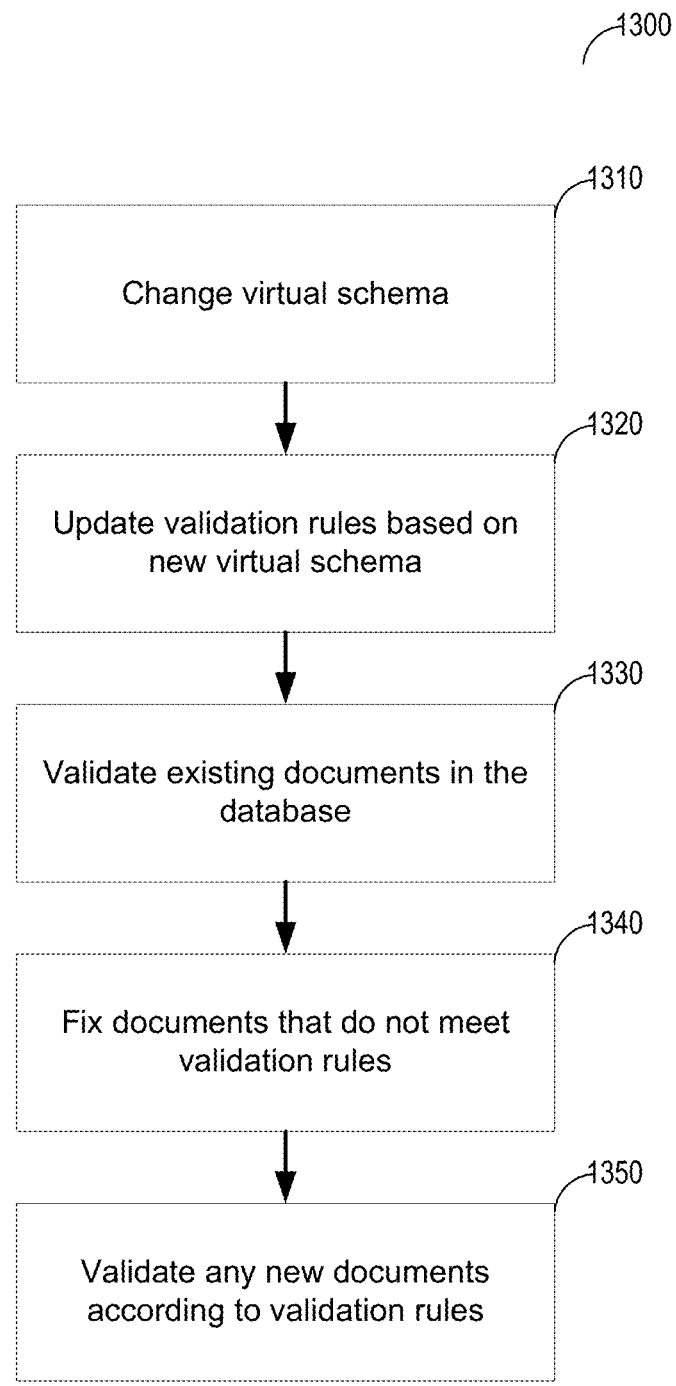
FIG. 13 shows a process for validating documents of a data set in response to a changed virtual schema according to one embodiment of the present invention.

FIG. 13 illustrates an exemplary process flow 1300 that a system (e.g. system 1110) may execute to update entities of a data set (e.g. data set 1120) responsive to a change in virtual schema.

Exemplary process 1300 begins at act 1310 in which the system executing process 1300 first changes the virtual schema. In some embodiments, the virtual schema may be changed at a regular time interval. Alternatively, the system may change the virtual schema in response to a user request or a change in user specification of criteria for a virtual schema. In other embodiments, the system may change the virtual schema in response to a resampling of data from a data set. For example, the system may resample documents from a non-relational database regularly to ensure that an up to date probabilistic model of the database is provided for users. After resampling the data, the system may update the current virtual schema according to attribute changes within documents, changes in user input criteria, changes in values of an attribute within documents, and/or other factors. The changed virtual schema will have new characteristics which documents from the database will have to match.

Next, process 1300 proceeds to act 1320 in which the system updates validation rules based on the new virtual schema. In some embodiments, the system may generate new validation rules and/or update existing validation rules in order to validate documents according to the changed virtual schema. The system may, for example, generate new rules to search for existence of attributes in documents, check for attribute values, and/or limit check attribute values. Further, the system may modify or remove previous validation rules that may not apply to the changed virtual schema.

Next, process 1300 proceeds to act 1330 where the system validates existing documents in the database. Upon updating the validation rules, the system may apply the validation rules to a plurality of the documents of the non-relational database to identify documents that do not meet the changed virtual schema. The system may, for example, use validation expressions to identify documents. In some embodiments, the system may log all documents that do not meet the validation rules. The system may execute various processes (e.g. processes 300, 400, and 500 described above) in order to validate documents of the non-relational database.

Next, process 1300 proceeds to act 1340 where the system fixes documents in the non-relational database that do not meet validation rules. In one embodiment, the system may access a log of identified documents that do not meet the updated validation rules. The system may automatically fix documents. Additionally or alternatively, the system may present a document to a user to request an update of the document for it to meet the validation rules. This step can insure that all documents in a non-relational database or collection of documents meet the validation rules and therefore are well represented by the virtual schema.

Next, process 1300 proceeds to act 1350 where the system is configured to validate any new documents according to the validation rules. In some embodiments, the system may generate a warning for any new documents inserted that do not meet validation rules. The system may, for example, generate message for a user informing the user of the validation failure. Additionally or alternatively, the system may reject any new document insertions or document updates in which the document does not meet the validation rules. This may insure that new documents inserted in the non-relational database or documents updated in the non-relational database are still well represented by the virtual schema.

Examples

As applications and development organizations grow more complex, data conventions or specifications can help ensure application stability. In one implementation of the database system, a new document validation capability may be provided that enables the database to regulate the structure and content of documents according to user specified rules.

It is appreciated, for instance, that inserts or updates that produce invalid documents may cause an application to malfunction or experience downtime. Such situations may be the result of internal or external factors.

● Internal. As applications grow more complex, they are architected as a combination of various components that act on shared collections. If a developer on one team introduces a new feature that breaks convention by changing document content, another developer's component may break.

● External. A collection containing input from various data feeds may require that every document adhere to a template in order for a centralized application to function properly. For example, an ecommerce web site may centralize a product catalog feed from each of its vendors into a single collection. If one of the vendors alters the format of its product catalog, the global catalog search could fail.

Today, development organizations enforce conventions to avoid such scenarios by writing special purpose modules to enforce document conventions this code must be maintained with each development iteration, increasing the cost and complexity of the application. According to one aspect, this validation functionality may be provided within the non-relational database and be provided as part of the normal operating mode of query functions.

Because this capability is provided, according to one embodiment, as part of the existing database operation functionality, document validation enables the application team to create a validator using already familiar query expressions instead of writing custom code, and the validation operation functions without modifying the external application. According to one implementation, the validator automatically tests every insert or update and rejects any violations with an error returned to the client.

Managing Validation

A validation expression can be associated with a collection. Once implemented and associated with a collection, the validator will enforce the rules for all future document inserts and updates. If the validator is added as part of the initial collection creation, then, by default, all future queries against the collection can correctly expect to only find documents that match the validation expression.

By default, according to one embodiment, the validator operates with a strict validationLevel, where all modifications or insertions to documents in the collection must result in documents that are valid.

Existing Documents

According to one embodiment, after adding a validation expression to a collection, the validator does not check existing documents. An existing collection may be large, and a query to identify all invalid documents may be resource intensive, affect the production system working set, or otherwise interfere with ongoing operations. Therefore, no guarantees can be made about the contents of the collection.

To properly characterize the validity of existing documents in a collection, the system may execute a query for all documents in the collection that match the negation of the validation expression (i.e. $nor). The result will represent all documents that would have been rejected if inserted into the collection after setting the validation expression. Make sure to execute this query against a secondary node or when sure the query will not interfere with database operations. Iterate over these documents and modify or replace them.

An update to an existing document will cause the validator to check the entire document. By default, according to one implementation, the validator rejects an update that would result in a document that does not match the validation expression (e.g., strict validation level). If multiple updates or iterations are required to fix a document, using the moderate validation level permits all updates to documents that are already failing the validation rules (e.g., having a status alreadyFailing). Every update for an alreadyFailing document will be permitted by the validator; however, once a document is valid, then all modifications will be validated (and rejected if the document does not match the validation expression). This moderate validation level enables users to incrementally improve the validity of documents and rely on the database engine to ensure that a valid document does not regress Exceptions to Validation According to one embodiment, there may be database operations that bypass validation because they do not modify a document. Additionally, a client application can bypass validation for a specific operation. Doing so may introduce invalid documents to the collection and should be carefully used however, it may be necessary to immediately update many documents, potentially render them invalid, and fix later. Bypassing therefore provides an option to skip the validator stage instead of deactivating the validation stage altogether.

Example

To help illustrate the various document validation aspects described earlier, the following describes a process for creating an example collection, setting up a validator, and illustrating the results of a number of insert and update requests.

Create a collection named "products" with validation on and set to require the field 'price' to exist in each document.

```
> db.createCollection("products", {validator: {price: {$exists: true}}})
{ "ok" : 1 }
db.products.runCommand("collMod", {validationAction: "error"})
{ "ok" : 1 }
```

Set a price for the item so it will pass validation.

```
> db.products.update({product_name:"apple watch"}, {$set : {price: "500"}})
WriteResult({ "nMatched" : 1, "nUpserted" : 0, "nModified" : 1 })
```

Rerun the query to find invalid documents and see that all pass validation now because there are no results:

```
> db.products.find( { $nor: [ {price: {$exists: true}} ] });
>
```

The following example uses a very simple validator for brevity of the sample code. Lastly, here is a moderately complex validator:

```
{"$and" : [
    {"name" : {
        "$exists" : true, "$type" : "string"
    }},
    {"$or" : [
        {"age" : {"$exists" : false}},
        {"age" : {
            "$gte" : 0,
            "$lte" : 120
        }}
    ]},
    {"$or" : [
        {"email" : {"$exists" : false}},
        {"email" : {
            "$regex"
            :/^[A-Za-z0-9\-\.\_]*@[A-Za-z0-9\-]*\.com$/
        }}
    ]},
    {"$or" : [
        {"phone" : {"$exists" : false}},
        { "country" : {"$ne" : "US"},
          "phone" : {"$regex" : /^[0-9]*$/}
        },
        {"country" : "US", "$or" : [
            {"phone" : {
                "$regex" :
                /^\([2-9][0-9][0-9]\)[0-9][0-9][0-9]-[0-9][0-9][0-9][0-9]$/
            }},
            {"phone"
```

```
              : {
              "$regex
              " :
    /^[2-9][0-9][0-9]-[0-9][0-9][0-9]-[0-9][0-9][0-9][0-9]$/
              }},
              {"phone"
              : {
              "$regex"
              :
    /^[2-9][0-9][0-9][0-9][0-9][0-9][0-9][0-9][0-9][0-9]$/
              }}
              ]}
          ]}
    ]}
```

The validator in this example requires the following of a document:
- a "name" field which must be a string
- "age" field must be either absent or a number in the range 0 to 120
- "email" must be absent, if present it must match the regular expression:
  ○ it must have only letters, numbers or " ",
  "_" or "." before the @ which must be
  present, and it must only have letters, numbers or " "
  after @ before ".com" suffix
  which is mandatory (no .org or .us).
- Phone number field "phone" can be absent, if present and country is not "US" phone
number can be a string containing any number of characters 09.

If country is "US" then
phone number must be a string which has one of three formats: 10 numbers (first cannot be 0 or 1), "(NNN) NNNNNNN" or "NNNNNNNNNN".

Example System Implementations

Various aspects and functions described herein, in accord with aspects of the present invention, may be implemented as hardware, software, or a combination of hardware and software on one or more computer systems. There are many examples of computer systems currently in use. Some examples include, among others, network appliances, personal computers, workstations, mainframes, networked clients, servers, media servers, application servers, database servers, web servers, and virtual servers. Other examples of computer systems may include mobile computing devices, such as cellular phones and personal digital assistants, and network equipment, such as load balancers, routers and switches. Additionally, aspects in accord with the present invention may be located on a single computer system or may be distributed among one or more computer systems connected to one or more communication networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the invention is not limited to executing on any particular system or group of systems. Further, aspects may be implemented in software, hardware or firmware, or any combination thereof. Thus, aspects in accord with the present invention may be implemented within methods, acts, systems, system placements and components using a variety of hardware and software configurations, and the implementation is not limited to any particular distributed architecture, network, or communication protocol. Furthermore, aspects in accord with the present invention may be implemented as specially-programmed hardware and/or software.

Figure 14:
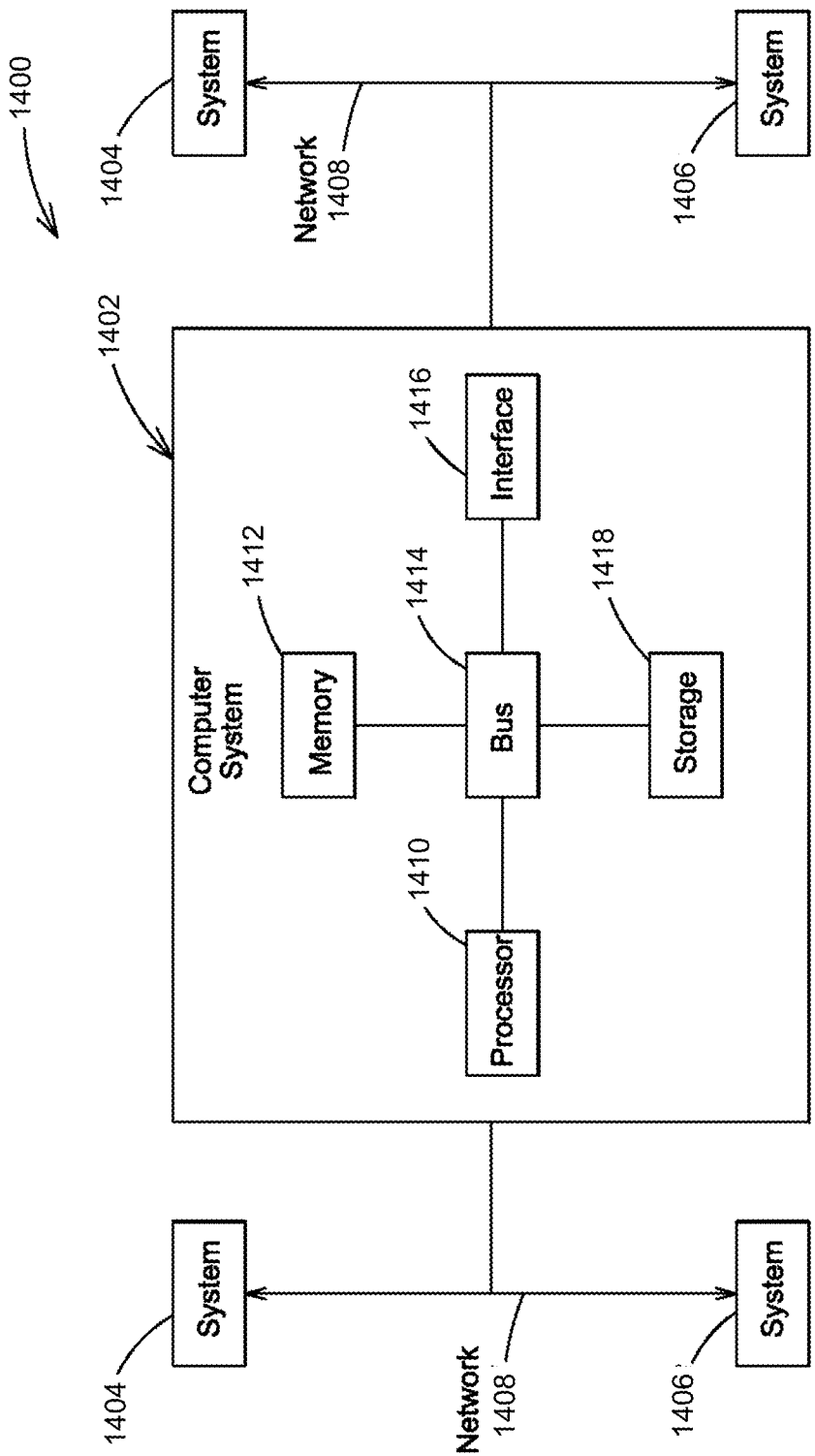
FIG. 14 shows an example computer system upon which various aspects of the present invention may be practiced.

FIG. 14 shows a block diagram of a distributed computer system 1400, in which various aspects and functions in accord with the present invention may be practiced. The distributed computer system 1400 may include one more computer systems. For example, as illustrated, the distributed computer system 1400 includes three computer systems 1402, 1404 and 1406. As shown, the computer systems 1402, 1404 and 1406 are interconnected by, and may exchange data through, a communication network 1408. The network 1408 may include any communication network through which computer systems may exchange data. To exchange data via the network 1408, the computer systems 1402, 1404, and 1406 and the network 1408 may use various methods, protocols and standards including, among others, token ring, Ethernet, Wireless Ethernet, Bluetooth, TCP/IP, UDP, HTTP, FTP, SNMP, SMS, MMS, SS7, JSON, XML, REST, SOAP, CORBA IIOP, RMI, DCOM and Web Services.

Computer systems 1402, 1404 and 1406 may include mobile devices such as cellular telephones. The communication network may further employ one or more mobile access technologies including 3rd (3G) or 4th (4G or LTE) generation radio access for cellular systems, WLAN, Wireless Router (WR) mesh, and other communication technologies. Access technologies such as 3G, 4G and LTE and future access networks may enable wide area coverage for mobile devices. For example, the network may enable a radio connection through a radio network access such as Global System for Mobil communication (GSM), General Packet Radio Services (GPRS), Enhanced Data GSM Environment (EDGE), Wideband Code Division Multiple Access (WCDMA), among other communication standards. Network may include any wireless communication mechanism by which information may travel between the devices 1404 and other computing devices in the network.

To ensure data transfer is secure, the computer systems 1402, 1404 and 1406 may transmit data via the network 1408 using a variety of security measures including TSL, SSL or VPN, among other security techniques. While the distributed computer system 1400 illustrates three networked computer systems, the distributed computer system 1400 may include any number of computer systems, networked using any medium and communication protocol.

Various aspects and functions in accord with the present invention may be implemented as specialized hardware or software executing in one or more computer systems including the computer system 1402 shown in FIG. 14. As depicted, the computer system 1402 includes a processor 1410, a memory 1412, a bus 1414, an interface 1416 and a storage system 1418. The processor 1410, which may include one or more microprocessors or other types of controllers, can perform a series of instructions that manipulate data. The processor 1410 may be a well-known, commercially available processor such as an Intel processor, or may be any other type of processor or controller as many other processors and controllers are available. As shown, the processor 1410 is connected to other system placements, including a memory 1412, by the bus 1414.

The memory 1412 may be used for storing programs and data during operation of the computer system 1402. Thus, the memory 1412 may be a relatively high performance, volatile, random access memory such as a dynamic random access memory (DRAM) or static memory (SRAM). However, the memory 1412 may include any device for storing data, such as a disk drive or other non-volatile storage device, such as flash memory or phase-change memory (PCM). Various embodiments in accord with the present invention can organize the memory 1412 into particularized and, in some cases, unique structures to perform the aspects and functions disclosed herein.

Components of the computer system 1402 may be coupled by an interconnection element such as the bus 1414. The bus 1414 may include one or more physical busses (for example, busses between components that are integrated within a same machine), and may include any communication coupling between system placements including specialized or standard computing bus technologies such as IDE, SCSI, PCI and InfiniBand. Thus, the bus 1414 enables communications (for example, data and instructions) to be exchanged between system components of the computer system 1402.

Computer system 1402 also includes one or more interfaces 1416 such as input devices, output devices and combination input/output devices. The interface devices 1416 may receive input, provide output, or both. For example, output devices may render information for external presentation. Input devices may accept information from external sources. Examples of interface devices include, among others, keyboards, mouse devices, trackballs, microphones, touch screens, printing devices, display screens, speakers, network interface cards, etc. The interface devices 1416 allow the computer system 1402 to exchange information and communicate with external entities, such as users and other systems.

Storage system 1418 may include a computer-readable and computer-writeable nonvolatile storage medium in which instructions are stored that define a program to be executed by the processor. The storage system 1418 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. A medium that can be used with various embodiments may include, for example, optical disk, magnetic disk or flash memory, among others. In operation, the processor 1410 or some other controller may cause data to be read from the non-volatile recording medium into another memory, such as the memory 1412, that allows for faster access to the information by the processor 1410 than does the storage medium included in the storage system 1418. The memory may be located in the storage system 1418 or in the memory 1412. The processor 1410 may manipulate the data within the memory 1412, and then copy the data to the medium associated with the storage system 1418 after processing is completed. A variety of components may manage data movement between the medium and the memory 1412, and the invention is not limited thereto.

Further, the invention is not limited to a particular memory system or storage system. Although the computer system 1402 is shown by way of example as one type of computer system upon which various aspects and functions in accord with the present invention may be practiced, aspects of the invention are not limited to being implemented on the computer system. Various aspects and functions in accord with the present invention may be practiced on one or more computers having different architectures or components than that shown in FIG. 14. For instance, the computer system 1402 may include specially-programmed, special-purpose hardware, such as for example, an application-specific integrated circuit (ASIC) tailored to perform a particular operation disclosed herein. Another embodiment may perform the same function using several general-purpose computing devices running an operating system and several specialized computing devices running proprietary hardware and operating systems.

The computer system 1402 may include an operating system that manages at least a portion of the hardware placements included in computer system 1402. A processor or controller, such as processor, may execute an operating system which may be, among others, a Windows-based operating system (for example, Windows 8, Windows 10, etc. operating systems) available from the Microsoft Corporation, a MAC OS operating system available from Apple Computer, one of many Linux-based operating system distributions (for example, the Enterprise Linux operating system available from Red Hat Inc.), or any other operating systems available from various sources. Many other operating systems may be used, and embodiments are not limited to any particular operating system.

The processor and operating system together define a computing platform for which application programs in high-level programming languages may be written. These component applications may be executable, intermediate (for example, C # or JAVA bytecode) or interpreted code which communicate over a communication network (for example, the Internet) using a communication protocol (for example, TCP/IP). Similarly, functions in accord with aspects of the present invention may be implemented using an object-oriented programming language, such as JAVA, C++, or C # (C-Sharp). Other object-oriented programming languages may also be used. Alternatively, procedural, scripting, or logical programming languages may be used.

Additionally, various functions in accord with aspects of the present invention may be implemented in a non-programmed environment (for example, documents created in HTML, XML or other format that, when viewed in a window of a browser program, render aspects of a graphical-user interface or perform other functions). Further, various embodiments in accord with aspects of the present invention may be implemented as programmed or non-programmed placements, or any combination thereof. For example, a web page may be implemented using HTML while a data object called from within the web page may be written in C++. Thus, the invention is not limited to a specific programming language and any suitable programming language could also be used.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system comprising:
   at least one processor operatively connected to a memory, the processor, when executing instructions, is configured to:
   accept a specification of a subset of documents or an entire set of documents of a non-relational database;
   select documents from the subset of documents or the entire set of documents to create sampled data; and
   identify a plurality of common attributes within the sampled data to build a virtual schema from the sampled data; and
   a validation component, executed by the at least one processor, configured to:
   generate a plurality of database validation rules based on the virtual schema; and
   validate one or more elements of a document of the non-relational database according to the plurality of database validation rules.

2. The system of claim 1, wherein the validation component is further configured to indicate whether the document does not meet at least one of the plurality of database validation rules.

3. The system of claim 1, wherein the validation component is further configured to validate a new document during a process of inserting the new document into the non-relational database.

4. The system of claim 3, wherein the validation component is further configured to reject the new document if the document does not meet at least one of the plurality of database validation rules from being added to the non-relational database.

5. The system of claim 1, wherein the validation component is further configured to validate the one or more elements of the document responsive to an update of the document.

6. The system of claim 5, wherein the validation component is further configured to apply a validation rule responsive to the update.

7. The system of claim 6, wherein the validation component is further configured to return an indication that the application of the validation rule to the document failed.

8. The system of claim 5, wherein the validation component is further configured to reject the update to the document if the update violates at least one of the plurality of database validation rules.

9. The system of claim 1, wherein the validation component is further configured to receive a plurality of user-defined validation rules and is configured to selectively apply the plurality of user-defined validation rules to the subset of documents or the entire set of documents.

10. The system of claim 1, wherein the validation component is further configured to query and fix existing documents in the non-relational database.

11. The system of claim 10, wherein the validation component is further configured to query and fix the existing documents in the non-relational database responsive to an update to the validation rules.

12. The system of claim 1, wherein the validation component is further configured to update the validation rules responsive to a change in the virtual schema.

13. The system of claim 1, wherein the validation component is configured to operate in a plurality of selectable modes, including:
    an inoperable mode;
    a moderate operating mode; and
    a strict mode.

14. The system of claim 1, wherein the processor is configured to randomly sample the subset of documents or the entire set of documents to create the sampled data.

15. The system of claim 1, wherein the processor is configured to selectively sample the subset of documents or the entire set of documents.

16. The system of claim 1, wherein the processor is configured to sample the subset of documents or the entire set of documents until a confidence level received from a user is met.

17. The system of claim 1, wherein the system is configured to receive the specification of the subset of documents or the entire set of documents from a user.

18. The system of claim 1, wherein the system is configured to identify the plurality of common attributes within the sampled data based on a ranked order of the attributes.

19. The system of claim 1, wherein
    the plurality of database validation rules include a plurality of validation expressions, and
    the validation component validates the document by querying the document to determine a match with a negation of at least one of the plurality of validation expressions.

20. A computer-implemented method comprising:
    accepting, by at least one processor, a specification of a subset of documents or an entire set of documents of a non-relational database;
    selecting, by the at least one processor, documents from the subset of documents or the entire set of documents to create sampled data;
    identifying, by the at least one processor, a plurality of common attributes within the sampled data;
    building, by the at least one processor, a virtual schema from the sampled data using the identified plurality of common attributes;
    generating, by a validation component, a plurality of database validation rules based on the virtual schema; and validating, by the validation component, one or more elements of a document of the non-relational database according to the plurality of database validation rules.

21. The method of claim 20, further comprising validating, by the validation component, a new document during a process of inserting the new document into the non-relational database.

22. The method of claim 21, further comprising rejecting, by the validation component, the new document from being added to the non-relational database if the document does not meet at least one of the plurality of database validation rules.

23. The method of claim 20, wherein the act of validating comprises validating the one or more elements of the document responsive to an update of the document.

24. The method of claim 23, further comprising rejecting, by the validation component, the update to the document if the update violates at least one of the plurality of database validation rules.

25. The method of claim 20, further comprising receiving, by the validation component, a plurality of user-defined validation rules and selectively applying the plurality of user-defined validation rules to the subset of documents or the entire set of documents.

26. The method of claim 20, further comprising querying and fixing, by the validation component, existing documents in the non-relational database.

27. The method of claim 20, further comprising updating, by the validation component, the validation rules responsive to a change in the virtual schema.

28. The method of claim 20, further comprising operating, by the validation component, in a plurality of selectable modes including an inoperable mode, a moderate mode, and a strict mode.

29. The method of claim 20, wherein the act of selecting includes randomly sampling, by the at least one processor, the subset of documents or the entire set of documents to create the sampled data.

30. The method of claim 20, wherein the act of selecting includes sampling, by the at least one processor, the subset of documents or the entire set of documents until a confidence level received from a user is met.

31. The method of claim 20, wherein the act of identifying the plurality of common attributes includes identifying the plurality of common attributes based on a ranked order of the attributes.

32. At least one non-transitory storage medium storing processor-executable instructions that, when executed, perform a method comprising:
   accepting a specification of a subset of documents or an entire set of documents of a non-relational database;
   selecting documents from the subset of documents or the entire set of documents to create sampled data;
   identifying a plurality of common attributes within the sampled data;
   building a virtual schema from the sampled data using the identified plurality of common attributes;
   generating a plurality of database validation rules based on the virtual schema; and
   validating one or more elements of a document of the non-relational database according to the plurality of database validation rules.

* * * * *